United States Patent
Kim et al.

(10) Patent No.: US 12,051,851 B2
(45) Date of Patent: Jul. 30, 2024

(54) ELECTRONIC DEVICE INCLUDING ANTENNA INCLUDING COUPLING-FEEDING STRUCTURE

(71) Applicant: Samsung Electronics Co., Ltd., Suwon-si (KR)

(72) Inventors: Jaehyung Kim, Suwon-si (KR); Hakjin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/946,681

(22) Filed: Sep. 16, 2022

(65) Prior Publication Data

US 2023/0014260 A1 Jan. 19, 2023

Related U.S. Application Data

(63) Continuation of application No. PCT/KR2021/003172, filed on Mar. 15, 2021.

(30) Foreign Application Priority Data

Mar. 17, 2020 (KR) .................. 10-2020-0032875

(51) Int. Cl.
*H01Q 1/24* (2006.01)
*H01Q 5/307* (2015.01)
*H01Q 21/06* (2006.01)

(52) U.S. Cl.
CPC ............. *H01Q 1/243* (2013.01); *H01Q 5/307* (2015.01); *H01Q 21/06* (2013.01)

(58) Field of Classification Search
CPC ........ H01Q 1/243; H01Q 5/307; H01Q 21/06; H01Q 5/357; H01Q 9/42; H01Q 21/28;
(Continued)

(56) References Cited

U.S. PATENT DOCUMENTS 9,799,964 B2   10/2017  Jang et al.
10,224,608 B2   3/2019  Lee et al.
(Continued)

FOREIGN PATENT DOCUMENTS

KR   10-2008-0111978   12/2008
KR   10-2014-0111739    9/2014
(Continued)

OTHER PUBLICATIONS

International Search Report for PCT/KR2021/003172 dated Jun. 25, 2021, 5 pages.
(Continued)

*Primary Examiner* — Daniel D Chang
(74) *Attorney, Agent, or Firm* — Nixon & Vanderhye, P.C.

(57) ABSTRACT

According to various embodiments, an electronic device includes: a housing; a first conductive member comprising a conductive material corresponding to a portion of the housing; a second conductive member comprising a conductive material arranged inside the housing; a printed circuit board arranged inside the housing; a wireless communication circuit arranged on the printed circuit board; and a conductive connection member comprising a conductive material electrically connected to the wireless communication circuit. The conductive connection member includes an elastic portion and at least one of a first surface, a second surface, a third surface, and a fourth surface. The elastic portion of the conductive connection member is in contact with the first conductive member, and the at least one of the first surface, the second surface, the third surface, and the fourth surface of the conductive connection member is spaced apart, by a gap, from a portion of the second conductive member. The wireless communication circuit may be configured to: receive a signal in a first frequency band by directly feeding
(Continued)

power to the first conductive member via the conductive connection member, and receive a signal in a second frequency band higher than the first frequency band by coupling-feeding power to the second conductive member via the conductive connection member.

13 Claims, 25 Drawing Sheets

(58) Field of Classification Search
CPC . H01Q 1/38; H04B 1/40; H04M 1/02; H04M 1/0249; H04M 1/0277
See application file for complete search history.

(56) References Cited

U.S. PATENT DOCUMENTS

| | | |
|---|---|---|
| 10,608,314 B2 | 3/2020 | Park et al. |
| 10,693,215 B2 | 6/2020 | Park et al. |
| 11,079,796 B2 | 8/2021 | Choe et al. |
| 2014/0132460 A1 | 5/2014 | Cho et al. |
| 2018/0269561 A1 | 9/2018 | Kim et al. |
| 2019/0081694 A1* | 3/2019 | Zhou ..................... H05K 1/028 |

FOREIGN PATENT DOCUMENTS

| | | | | |
|---|---|---|---|---|
| KR | 10-1580546 | 12/2015 | | |
| KR | 10-2016-0060352 | 5/2016 | | |
| KR | 20160060352 A | * 5/2016 | ............... H01Q 1/24 |
| KR | 10-2017-0105896 | 9/2017 | | |
| KR | 10-1973127 | 4/2019 | | |
| KR | 10-2019-0141852 | 12/2019 | | |

OTHER PUBLICATIONS

Written Opinion of the ISA for PCT/KR2021/003172 dated Jun. 25, 2021, 3 pages.
Korean Office Action issued Feb. 2, 2024 in corresponding Korean Patent Application No. 10-2020-0032875.

* cited by examiner

ELECTRONIC DEVICE INCLUDING ANTENNA INCLUDING COUPLING-FEEDING STRUCTURE

CROSS-REFERENCE TO RELATED APPLICATIONS

This application is a continuation of International Application No. PCT/KR2021/003172, designating the United States, filed on Mar. 15, 2021, in the Korean Intellectual Property Receiving Office, and claiming priority to Korean Patent Application No. 10-2020-0032875, filed on Mar. 17, 2020, in the Korean Intellectual Property Office, the disclosures of which are incorporated by reference herein in their entireties.

BACKGROUND

Field

The disclosure relates to an electronic device including an antenna including a coupling-feeding structure.

Description of Related Art

An electronic device such as a smart phone or a tablet can include an antenna as a part of the device in order to transmit and/or receive radio waves, and include a plurality of antennas in order to transmit and/or receive radio waves in various frequency bands and support a communication service.

A side member (e.g., a side wall or bezel) of an electronic device recently released can include a conductive material, and at least a part of the side member can be used as an antenna radiator through feeding power.

An electronic device has a space where an antenna can be mounted. With an increase of communication schemes such as the introduction of the 5G technology in addition to 3G and 4G, securing a space for the antenna is limited, and even if an antenna is added to the existing space, interference can occur between the existing antenna and the added antenna and deteriorate the radiation performance of the antenna.

SUMMARY

Embodiments of the disclosure may provide a device and/or method for implementing an additional antenna in a situation in which an internal space of an electronic device is limited.

An electronic device according to various example embodiments of the disclosure may include: a housing, a first conductive member comprising a conductive material corresponding to one portion of the housing, a second conductive member comprising a conductive material arranged inside the housing, a printed circuit board arranged inside the housing, a wireless communication circuit arranged on the printed circuit board, and a conductive connection member comprising a conductive material electrically connected to the wireless communication circuit. The conductive connection member may include an elastic portion and at least one surface. The elastic portion of the conductive connection member may be in contact with the first conductive member. The at least one surface of the conductive connection member may be spaced apart, by a gap, from a portion of the second conductive member. The wireless communication circuit may be configured to: receive a signal of a first frequency band by directly feeding power to the first conductive member via the conductive connection member, and receive a signal of a second frequency band higher than the first frequency band by coupling-feeding power to the second conductive member via the conductive connection member.

An electronic device according to various example embodiments may include: a first conductive member comprising a conductive material, a second conductive member comprising a conductive material, a printed circuit board, a wireless communication circuit arranged on the printed circuit board, and a conductive connection member comprising a conductive material electrically connected to the wireless communication circuit. The conductive connection member may include an elastic portion and at least one surface. The elastic portion of the conductive connection member may be in contact with the first conductive member. The at least one surface of the conductive connection member may be spaced apart, by a gap, from a portion of the second conductive member. The wireless communication circuit may be configured to: receive a signal of a first frequency band by directly feeding power to the first conductive member via the conductive connection member, and receive a signal of a second frequency band higher than the first frequency band by coupling-feeding power to the second conductive member via the conductive connection member.

According to various example embodiments of the disclosure, an electronic device may transmit and/or receive a signal of a first frequency band by directly feeding power to a first conductive member via a conductive connection member, and may transmit and/or receive a radio wave of a second frequency band by coupling-feeding power to a second conductive member via the conductive connection member, and thus may increase a space efficiency of the electronic device.

According to various example embodiments, a frequency band at which radiation performance is maximized and/or improved may be adjusted by changing an area of the second conductive member causing coupling with the conductive connection member.

In addition, various effects directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with a description of the drawings, the same or similar reference numerals may be used for the same or similar components.

DETAILED DESCRIPTION

Hereinafter, various example embodiments of the present disclosure will be described in greater detail with reference to the accompanying drawings. However, this is not intended to limit the present disclosure to specific embodiments, and should be understood as including various modifications, equivalents, or alternatives of the embodiments of the present disclosure.

Figure 1A:
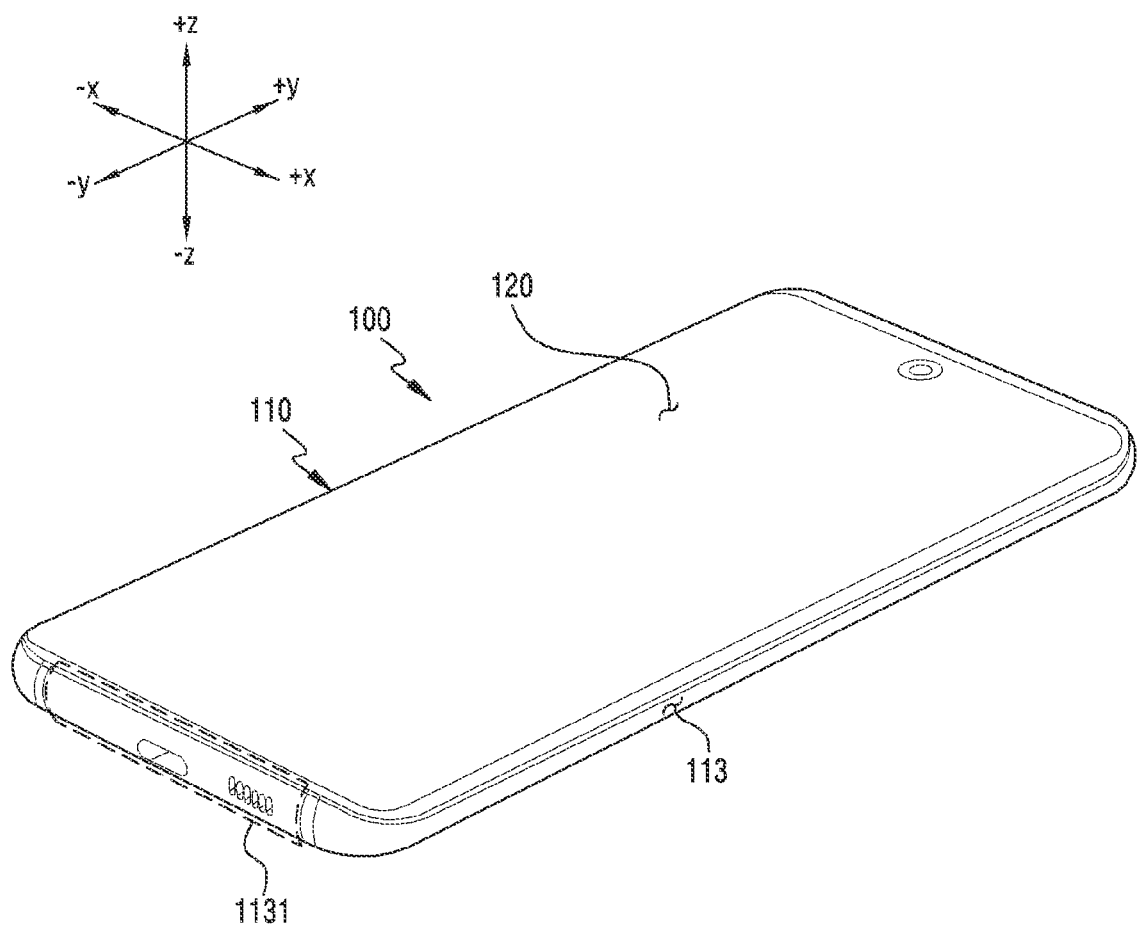
FIG. 1A is a front perspective view of an electronic device according to various embodiments.
Figure 1B:
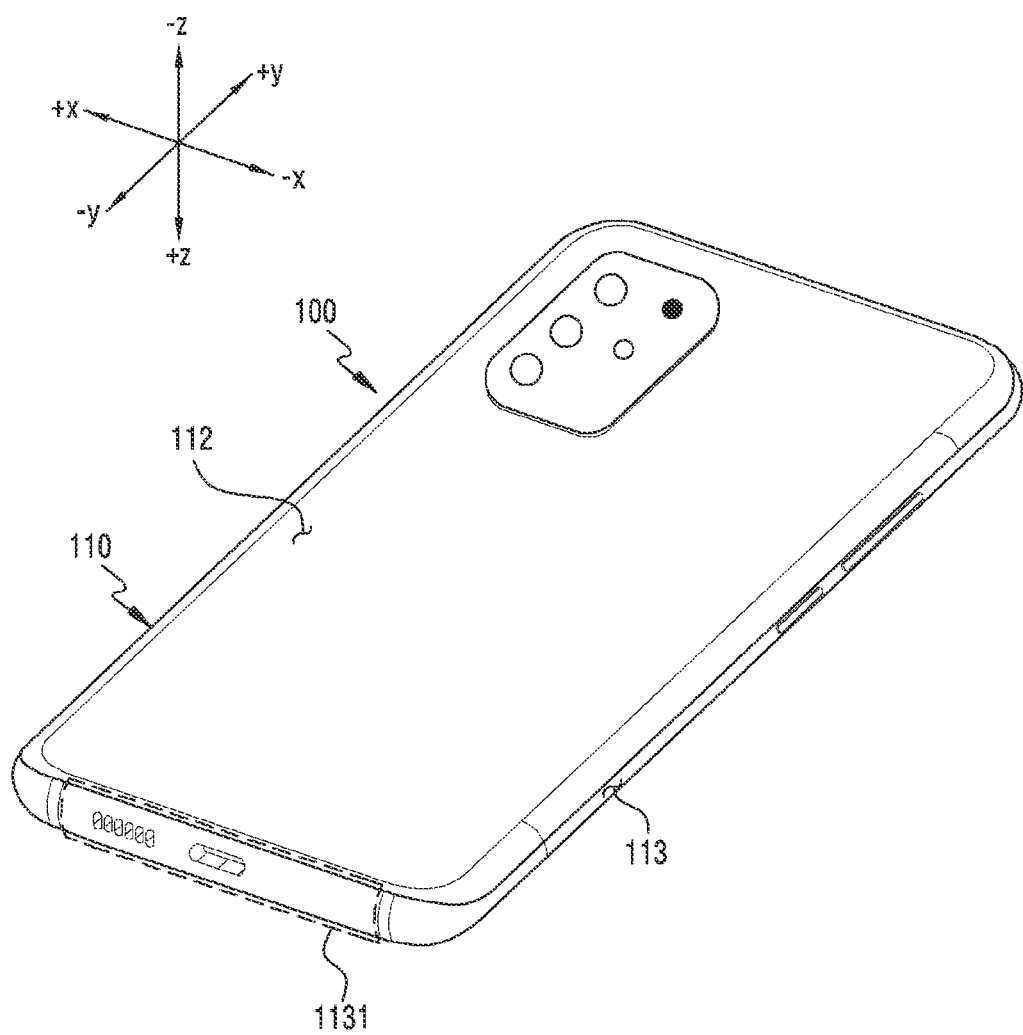
FIG. 1B is a rear perspective view of an electronic device according to various embodiments.

FIG. 1A is a front perspective view of an electronic device 100 according to various embodiments. FIG. 1B is a rear perspective view of the electronic device 100 according to various embodiments.

Referring to FIG. 1A and FIG. 1B, the electronic device 100 of an embodiment may include a rear plate 112, a display 120 arranged on a front surface of the electronic device 100, and a housing 110 including a side member 113 surrounding a space between the display 120 and the rear plate 112.

In an embodiment, the display 120 may occupy most of the front surface of the electronic device 100. For example, the display 120 may be arranged on the front surface of the electronic device 100.

According to an embodiment, the rear plate 112 may be formed of a coated or colored glass, a ceramic, a polymer, a metal (e.g., aluminum, stainless steel (STS), or magnesium), or a combination of at least two of the above materials. According to an embodiment, the rear plate 112 may include a curved portion that is bent toward the side member 113 from at least one end and extended seamlessly.

According to an embodiment, the side member 113 may be coupled to the rear plate 112, and include a metal and/or a polymer. According to an embodiment, the rear plate 112 and the side member 113 may be integrally formed and may include the same material (e.g., a metal material such as aluminum).

According to an embodiment, a conductive portion of the side member 113 may operate as an antenna radiator that is electrically connected to a wireless communication circuit and transmits and/or receives a radio frequency (RF) signal of a specified frequency band. According to an embodiment, the wireless communication circuit may transmit an RF signal of a specified frequency band to the conductive portion of the side member 113, or receive an RF signal of a specified frequency band from the conductive portion.

The electronic device 100 illustrated in FIG. 1A and FIG. 1B is an example, and does not limit the form of the device to which a technological spirit disclosed in the present disclosure is applied. The technological spirit disclosed in the present disclosure is applicable to various user devices including a part capable of operating as an antenna radiator. For example, the technological spirit disclosed in the present disclosure may be applied to a foldable electronic device, a tablet, or a notebook computer that is foldable in a horizontal direction or foldable in a vertical direction by employing a flexible display and a hinge structure.

Hereinafter, various example embodiments will be described with reference to the electronic device 100 shown in FIG. 1A and FIG. 1B for convenience of description.

Figure 2:
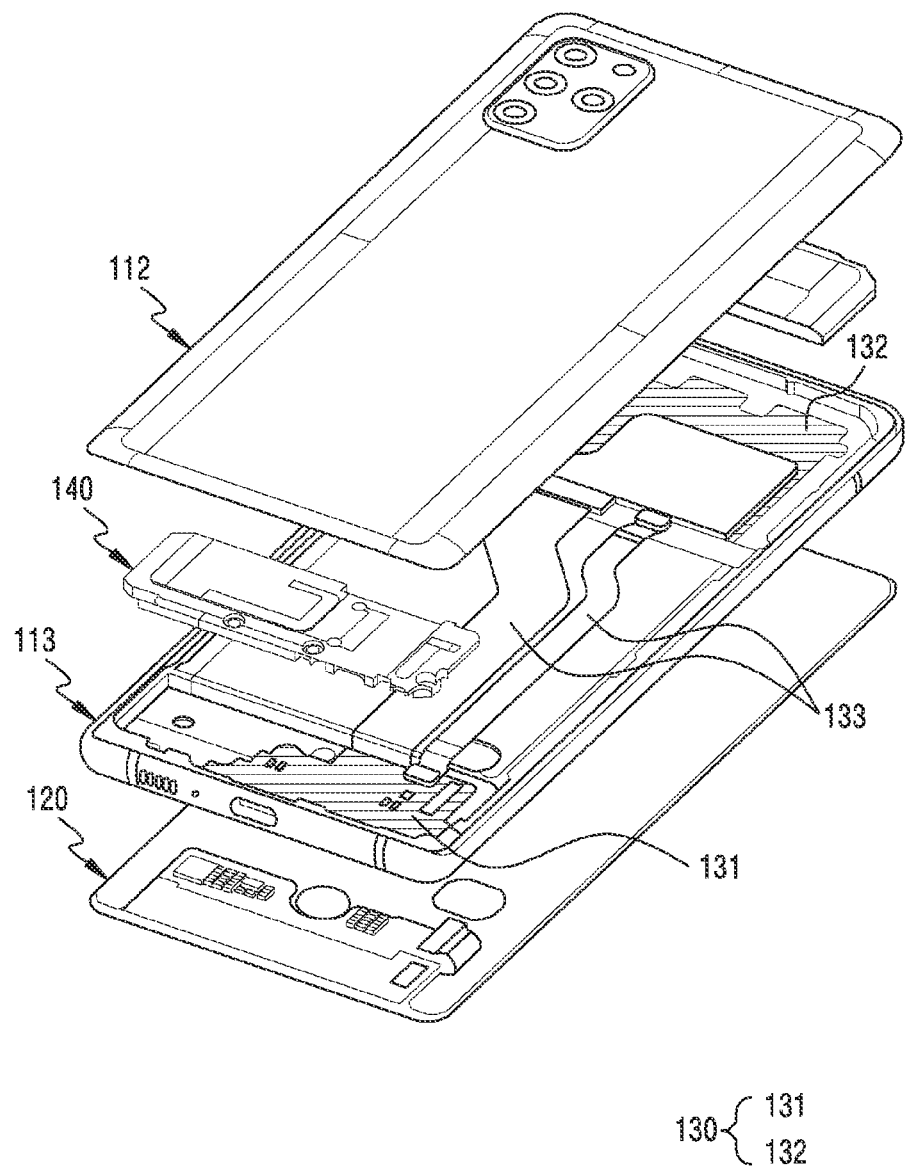
FIG. 2 is an exploded perspective view of an electronic device according to various embodiments.

FIG. 2 is an exploded perspective view of the electronic device 100 according to various embodiments.

Referring to FIG. 2, the electronic device 100 of an embodiment may include a rear plate 112, a carrier 140, at least one printed circuit board 130, a side member 113, and a display 120. The electronic device 100 of an embodiment may omit at least one of the above-described components, or additionally include other components.

According to an embodiment, the rear plate 112 may form a rear surface of the electronic device 100. The rear plate 112 may protect the electronic device 100 from an external impact or foreign substances.

According to an embodiment, the carrier 140 may be arranged between the rear plate 112 and the at least one printed circuit board 130. According to an embodiment, an antenna may be located in the carrier 140. According to an embodiment, the carrier 140 may be formed of a non-conductive material.

According to an embodiment, a plurality of electronic components may be arranged on the at least one printed circuit board 130. In an embodiment, a processor, a memory, and/or an interface may be arranged on the at least one printed circuit board 130.

According to an embodiment, the at least one printed circuit board 130 may include a first printed circuit board 131, and a second printed circuit board 132 connected to the first printed circuit board 131 via an electrical connection member 133. However, the printed circuit board 130 of the present disclosure is not limited to the above-described example, and in various embodiments, the printed circuit board may be formed of one substrate.

According to an embodiment, the display 120 may emit light from a pixel in order to transmit information to a user, and the light emitted from the pixel may be transmitted to the outside of the electronic device 100 through the display 120.

According to an embodiment, the side member 113 may form a side surface of the electronic device 100.

According to an embodiment, the side member 113 may include at least one conductive portion and at least one insulating portion. For example, an antenna may be formed on the at least one conductive portion using the at least one insulating portion. According to an embodiment, at least two or more conductive portions may be formed of a conductive material (e.g., a metal). The at least one insulating portion may be formed of a polymer (e.g., polycarbonate).

According to an embodiment, at least a part of the conductive portion may be electrically connected to the wireless communication circuit, and operate as an antenna radiator for transmitting and/or receiving an RF signal of a specified frequency band.

Figure 3A:
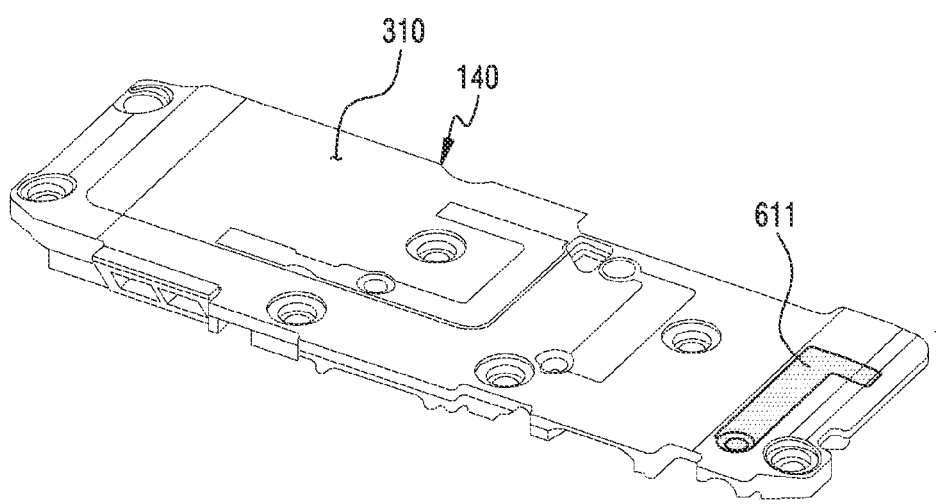
FIG. 3A is a perspective view of a first surface of a carrier according to various embodiments.
Figure 3B:
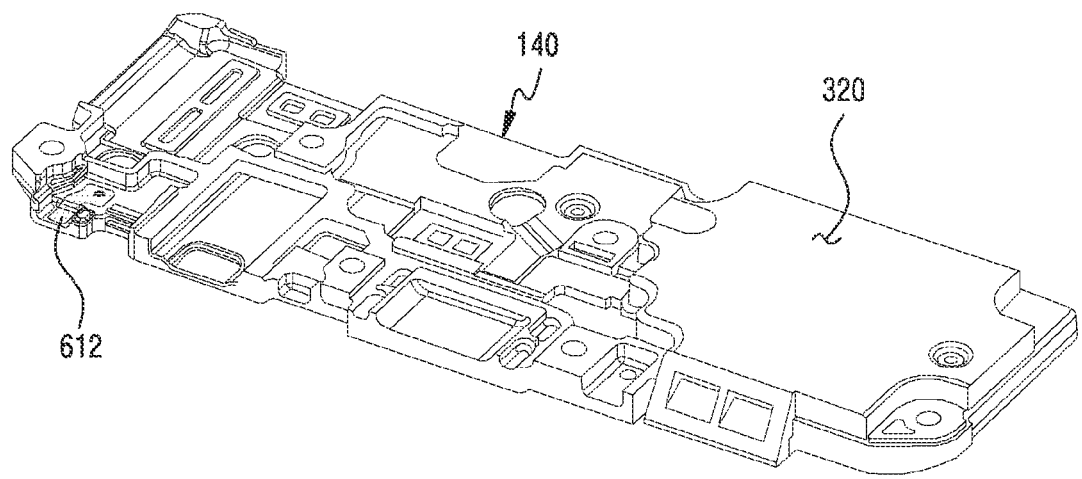
FIG. 3B is a perspective view of a second surface of a carrier according to various embodiments.

FIG. 3A is a perspective view illustrating a first surface 310 of a carrier 140 according to various embodiments. FIG. 3B is a perspective view illustrating a second surface 320 located opposite to the first surface 310 of the carrier 140 according to various embodiments.

Figure 6A:
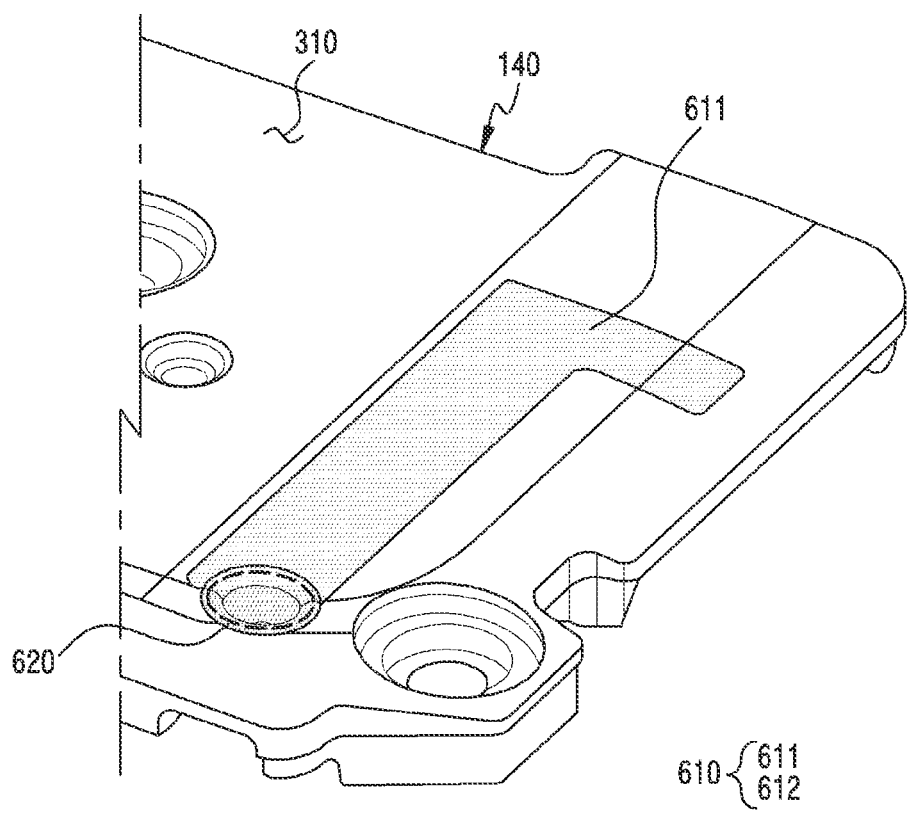
FIG. 6A is a perspective view of a front surface of a part of a carrier according to various embodiments.

Referring to FIG. 3A, FIG. 3B and FIG. 6A, a first portion 611 of a second conductive member 610 may be located on the first surface 310 of the carrier 140, and a second portion 612 of the second conductive member 610 may be located on the second surface 320 of the carrier 140.

Figure 4A:
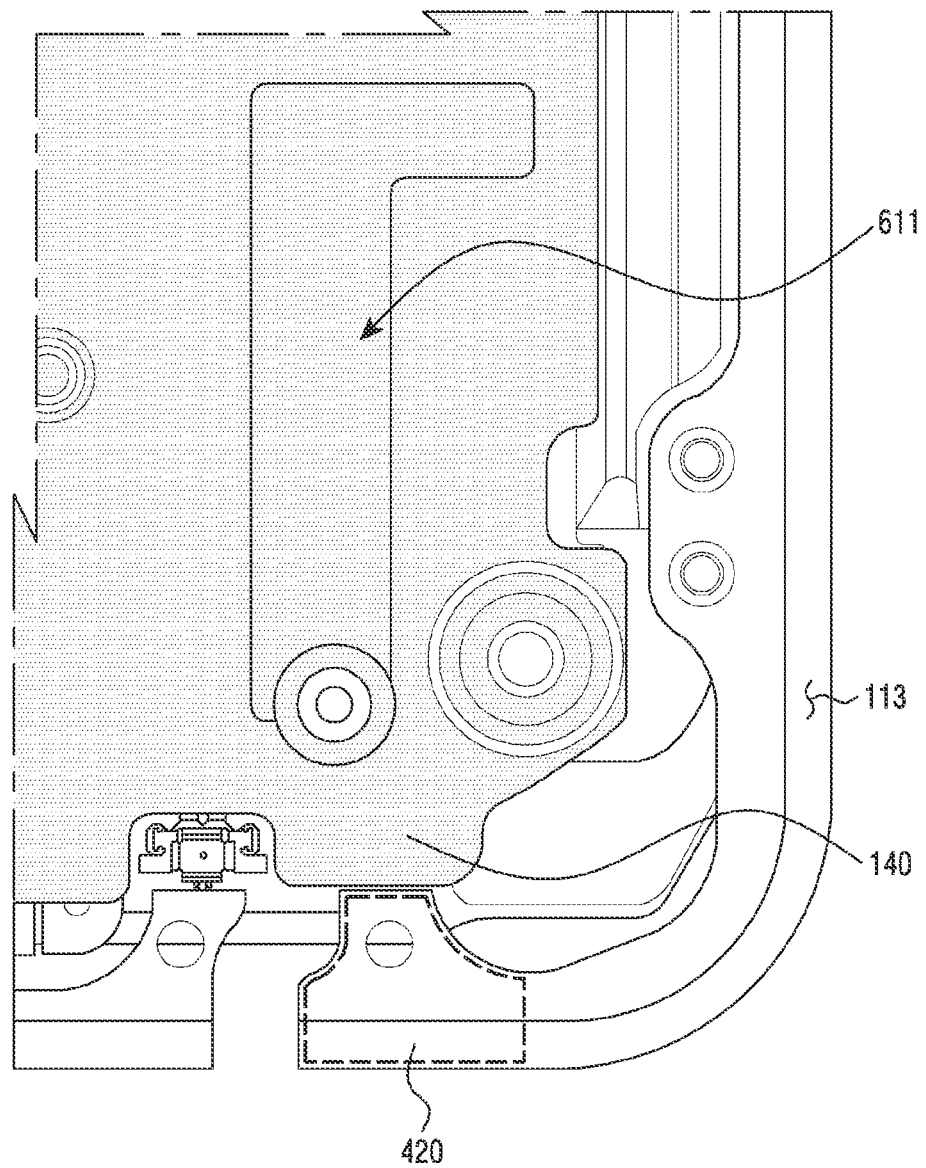
FIG. 4A is a diagram illustrating a part of an electronic device in a state in which a carrier is mounted according to various embodiments.
Figure 4B:
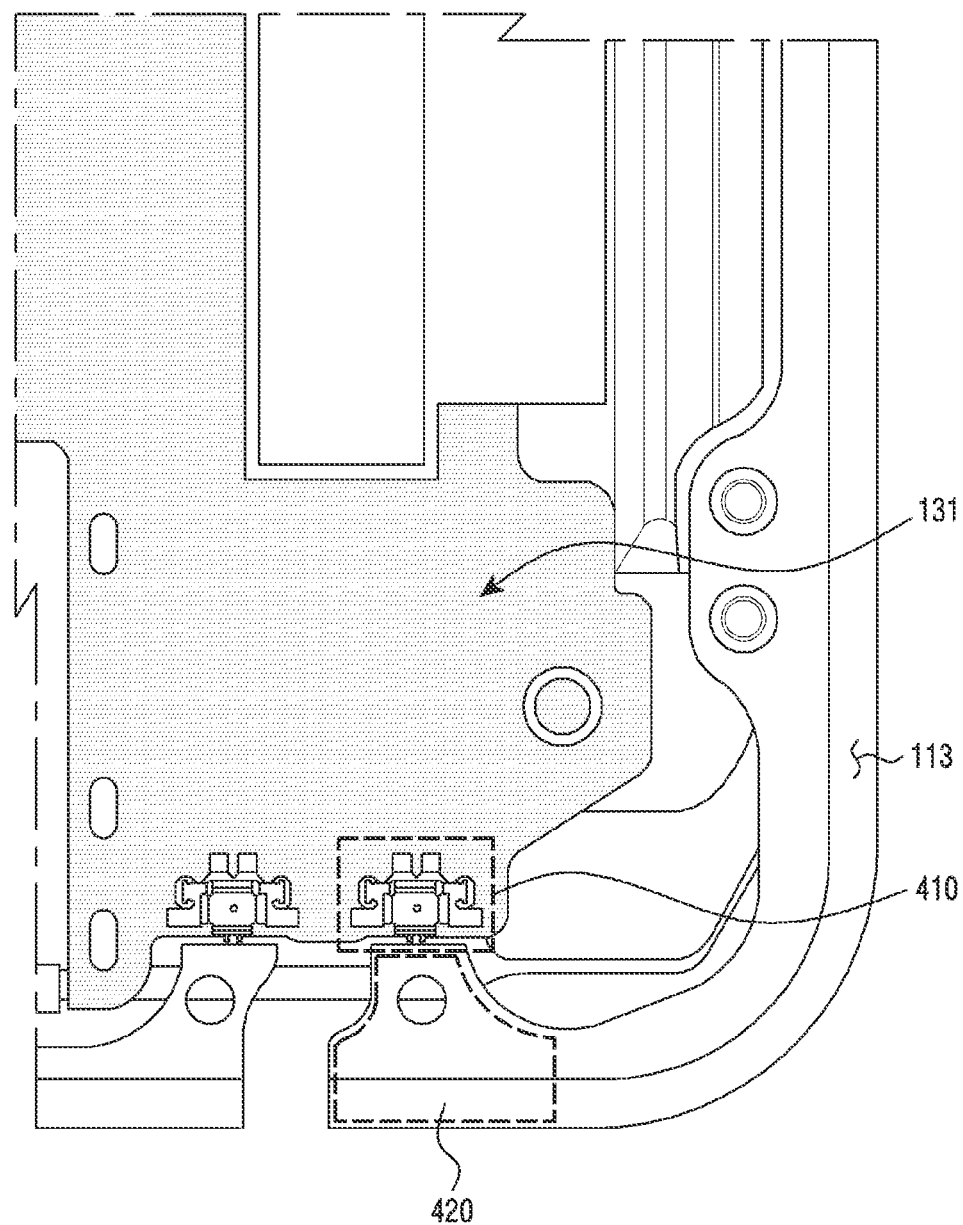
FIG. 4B is a diagram illustrating a part of an electronic device in a state in which a carrier is removed according to various embodiments.

FIG. 4A is a diagram illustrating a part of an electronic device in a state in which the carrier 140 is mounted according to various embodiments. FIG. 4B is a diagram illustrating a part of the electronic device in a state in which the carrier 140 is removed according to various embodiments. According to an embodiment, the second conductive member 610 may be formed of an FPCB and attached to the rear plate 112 as well. For another example, the second conductive member 610 may be formed in an LDS pattern on the rear plate 112. In an embodiment, the carrier 140 may be omitted as well.

Figure 5A:
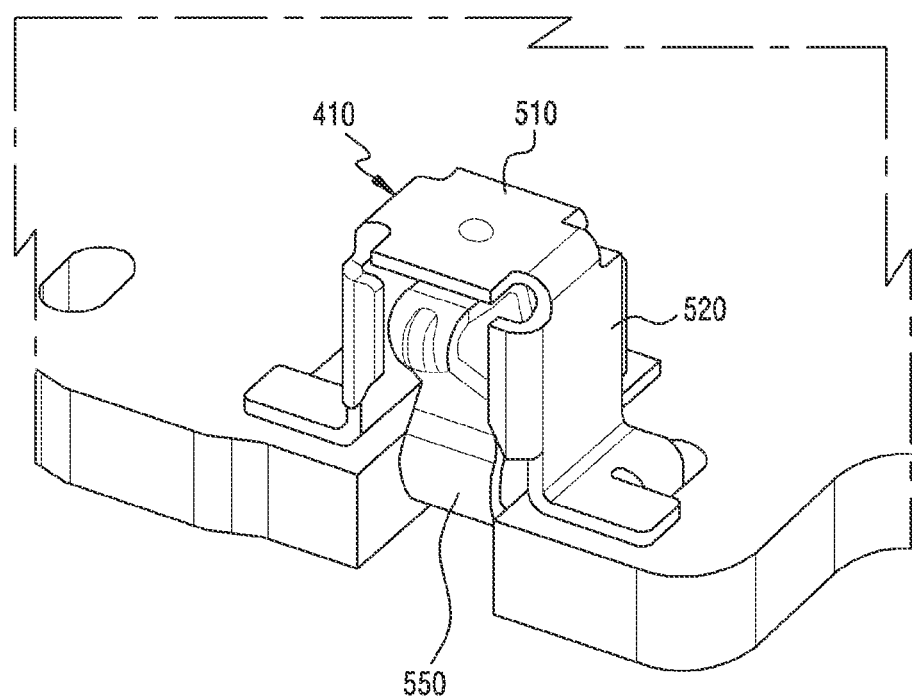
FIG. 5A is a front perspective view of a conductive connection member according to various embodiments.

Referring to FIG. 4A, FIG. 4B and FIG. 5A, when viewed from the top of one surface of the carrier 140, at least a part of the carrier 140 of an embodiment may be located to overlap with a first surface 510 of the at least one conductive connection member 410.

Referring to FIG. 4B, the first printed circuit board 131 may be included in the electronic device 100 of FIG. 4A. For another example, the at least one conductive connection member 410 may be electrically connected to the wireless communication circuit arranged on the first printed circuit board 131.

Referring to FIG. 1A, FIG. 1B, FIG. 4A, and FIG. 4B, at least a part of the side member 113 forming the side surface of the housing 110 may include the first conductive member 420. In an embodiment, the first conductive member 420 may be located in a first portion 1131 corresponding to a terminal end when viewed in a −y direction from the housing 110.

However, an area and position of the first conductive member 420 are not limited to the above-described embodiment, and may be changed according to need. In an embodiment, the conductive connection member 410 may be electrically connected to the first conductive member 420. For example, a part of the conductive connection member 410 may be in direct contact with and electrically connect with a protrusion formed on the first conductive member 420.

Figure 5B:
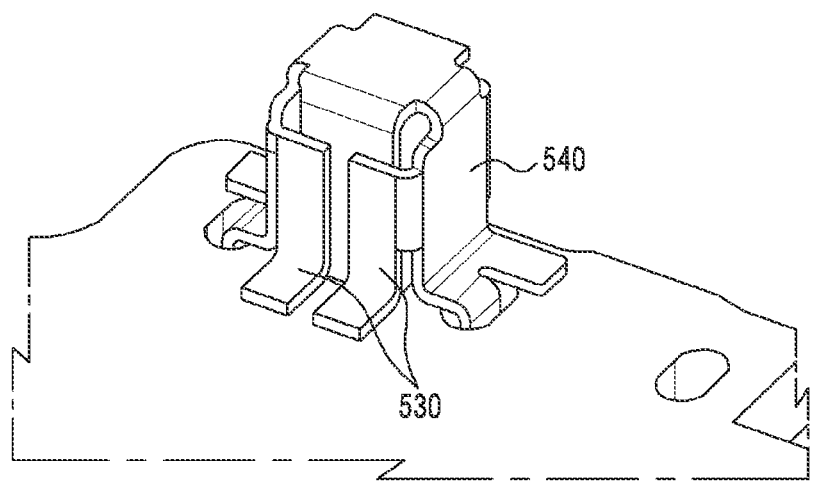
FIG. 5B is a rear perspective view of a conductive connection member according to various embodiments.

FIG. 5A is a front perspective view of the conductive connection member 410 according to various embodiments. FIG. 5B is a rear perspective view of the conductive connection member 410 according to various embodiments.

Referring to FIG. 5A and FIG. 5B, in an embodiment, the conductive connection member 410 may include an elastic portion 550, the first surface 510, a second surface 520, a third surface 530, or a fourth surface 540.

Referring to FIG. 5A, in an embodiment, the elastic portion 550 may be formed in an "S" shape or an appropriate curved shape while extending from the conductive connection member 410. According to an embodiment, the elastic portion 550 may have an elastic force and protect the conductive connection member 410 from an external impact. For example, the elastic portion 550 may be in contact with the first conductive member 420, and prevent and/or reduce damage to parts in response to an impact or deformation applied to the first conductive member 420.

According to an embodiment, the first conductive member 420 may be electrically connected to a wireless communication circuit arranged on the printed circuit board 130, through the elastic portion 550 of the conductive connection member 410. The wireless communication circuit may feed power to the first conductive member 420 via the conductive connection member 410.

According to an embodiment, a part of the first surface 510, the second surface 520, the third surface 530, or the fourth surface 540 may be formed to be perpendicular or parallel to the elastic portion 550. According to an embodiment, at least a part of the first surface 510, the second surface 520, the third surface 530, or the fourth surface 540 may be physically connected through the seamlessly extended curved portion. For another example, at least a part of the first surface 510, the second surface 520, the third surface 530, or the fourth surface 540 may be formed in a coupling manner.

According to an embodiment, the conductive connection member 410 may be located on the printed circuit board 130. In an embodiment, the conductive connection member 410 may be coupled to the printed circuit board 130 through a fixing member. For example, the fixing member may include a screw or an adhesive member. For another example, the conductive connection member 410 may be coupled to the printed circuit board 130 using a fixing structure included in the conductive connection member 410. According to an embodiment, a portion in which the conductive connection member 410 is connected to the printed circuit board 130 may be located at an outer portion (e.g., a corner portion) of the printed circuit board 130.

Figure 6B:
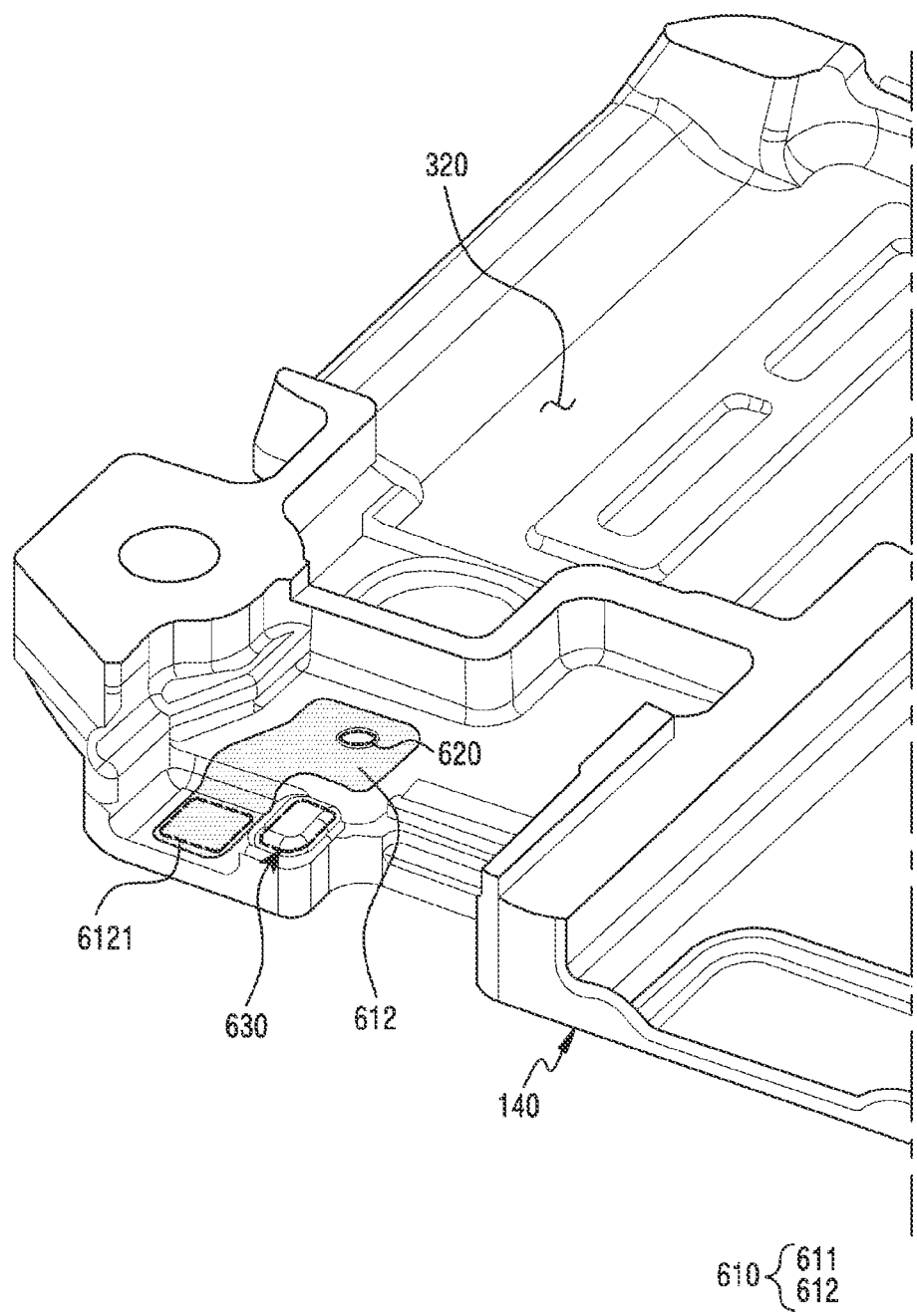
FIG. 6B is a perspective view of a rear surface of a part of a carrier according to various embodiments.

FIG. 6A is a perspective view illustrating the first surface 310 of a part of the carrier 140 according to various embodiments. FIG. 6B is a perspective view illustrating the second surface 320 located opposite to the first surface 310 of a part of the carrier 140 according to various embodiments.

Referring to FIG. 6A and FIG. 6B, in an embodiment, the second conductive member 610 may be located on at least a part of the carrier 140. In this case, a first portion 511 of the second conductive member 610 and a second portion 612 of the second conductive member 610 may be connected through a groove 620 and be integrally formed.

According to an embodiment, the first portion 611 of the second conductive member 610 and the second portion 612 of the second conductive member 610 may be formed on the carrier 140 in a laser direct structuring (LDS) pattern. For another example, the second conductive member 610 may be formed in an FPCB shape and be arranged on the carrier 140. However, a scheme of forming the conductive member on the carrier is not limited to forming in the LDS pattern, and may include even other schemes capable of being made of a conductive material and functioning as an antenna radiator.

According to an embodiment, the second portion 612 of the second conductive member 610 may be formed to have a step in the carrier 140. In this case, one portion 6121 of the second portion 612 of the second conductive member 610 may be formed as a flat area, and the one portion 6121 may be spaced apart, by a gap, from at least one surface of the conductive connection member 410. However, the shape of the one portion 6121 is not limited to the above embodiment, and may include other shapes of being able to be spaced apart, by a gap, from the at least one surface of the conductive connection member 410. In an embodiment, the one portion 6121 of the second portion 612 and other portion of the second portion 612 may be formed to have a step. For example, the one portion 6121 of the second portion 612 may be closer to the first surface 310 of the carrier 140 than the other portion of the second portion 612.

According to an embodiment, the second portion 512 of the second conductive member 610 may be arranged in a concave portion of the carrier 140. The second portion 612 of the second conductive member 610 may be located to be coupled to the first surface 510 of the conductive connection member 410. For example, the one portion 6121 of the second portion 612 may be located to be coupled to the first surface 510 of the conductive connection member 410.

According to an embodiment, one portion 630 of the carrier 140 may be in physical contact with a PCB. The one portion 630 of the carrier 140 may make possible stable coupling feeding by maintaining a gap between the one portion 6121 of the second portion 612 of the second conductive member 610 and the first surface 510 of the conductive connection member 410.

Figure 7A:
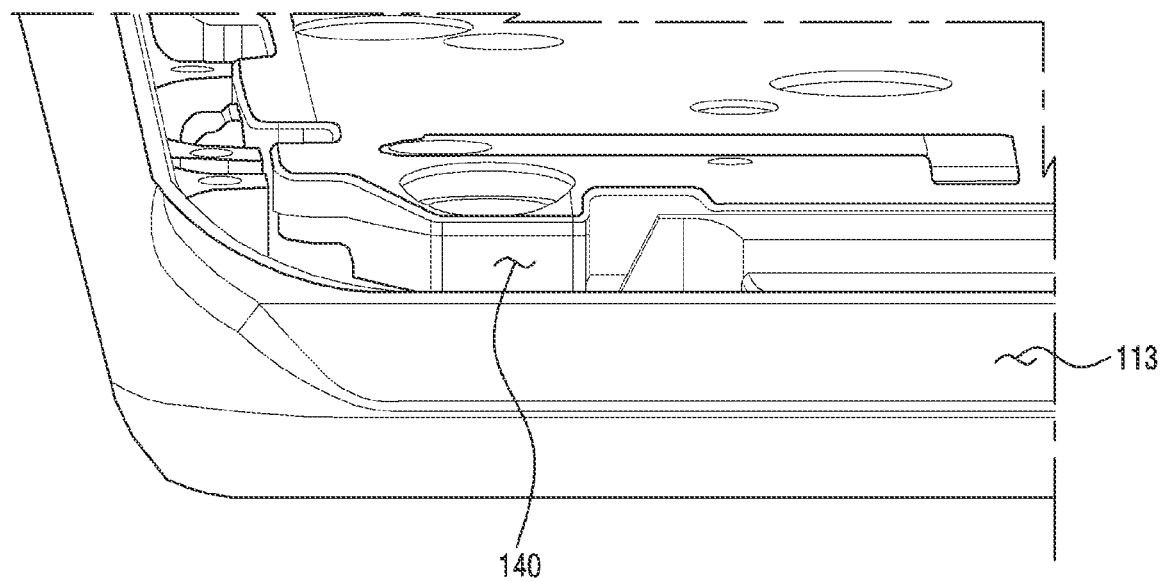
FIG. 7A is a perspective view of a side surface of a part of an electronic device according to various embodiments.
Figure 7B:
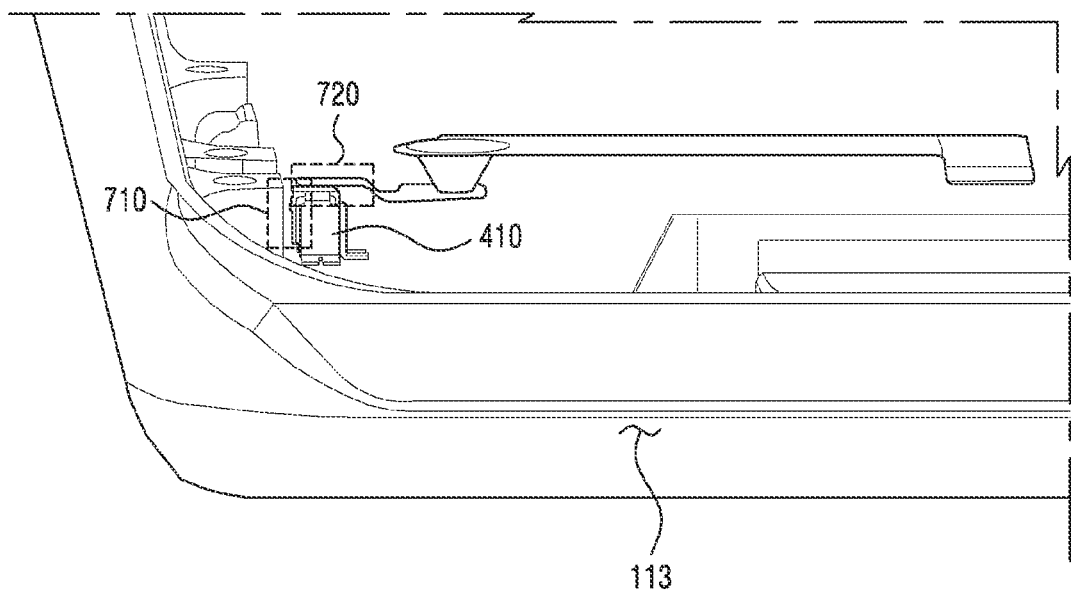
FIG. 7B is a perspective view illustrating a side surface of a part of an electronic device according to various embodiments.
Figure 7C:
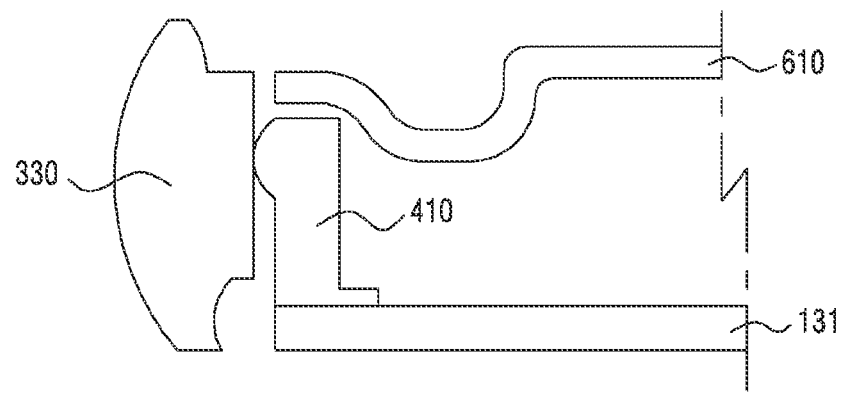
FIG. 7C is a diagram illustrating a side surface of a part of an electronic device according to various embodiments.

FIG. 7A is a perspective view illustrating a side surface of a part of an electronic device according to various embodiments. FIG. 7B is a perspective view illustrating the side surface of a part of the electronic device according to various embodiments. FIG. 7C is a diagram illustrating the side surface of a part of the electronic device according to various embodiments. Referring to FIG. 7A, in an embodiment, at least a part of the side member 113 forming a side surface of the housing 110 may include the first conductive member 420. The first conductive member 420 may be located to be electrically connected to the conductive connection member 410.

Referring to FIG. 7B and FIG. 7C, the conductive connection member 410 may be in contact with the first conductive member 420 through a first portion 710, and a second portion 720 of the conductive connection member 410 may be spaced apart, by a gap, from the second conductive member 610.

Referring to FIG. 7C, the conductive connection member 410 may be arranged between the first printed circuit board 131 and the carrier 140. In an embodiment, a wireless communication circuit may be arranged on the first printed circuit board 131. The conductive connection member 410 may be electrically connected to the wireless communication circuit.

According to an embodiment, the conductive connection member 410 may be in contact with the first conductive member 420 through the elastic portion 550.

According to an embodiment, at least one surface (e.g., the first surface 510 of FIG. 5A) of the conductive connection member 410 may be spaced apart, by a gap, from a partial region of the second conductive member 610 (e.g., the one portion 6121 of the second portion 612 of the second conductive member 610). For example, the conductive connection member 410 may be arranged on the printed circuit board 130 wherein coupling feeding to a part of the second conductive member 610 is possible.

According to various embodiments, the conductive connection member 410 may include a C-clip. However, the conductive connection member 410 is not limited only to the C-clip, and may be another conductive connection member that may be in contact with at least a part of the side member 1130 forming the side surface of the housing 110 and be spaced apart, by a gap, from a partial region of the second conductive member 610 and feed power to the conductive member.

Figure 8:
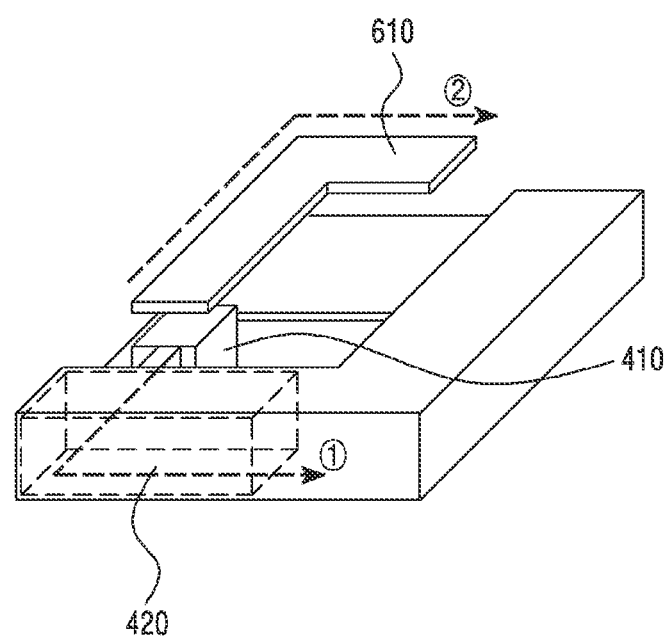
FIG. 8 is a perspective view illustrating a first conductive member, a second conductive member, a conductive connection member, and antenna radiation according to various embodiments.

FIG. 8 is a perspective view illustrating the conductive connection member 410, the first conductive member 420, the conductive connection member 410, the second conductive member 610, and antenna radiation paths (①and ②) according to various embodiments.

Referring to FIG. 5A, FIG. 5B, and FIG. 8, in an embodiment, the elastic portion 550 of the conductive connection member 410 may be in contact with the first conductive member 420 (e.g., one portion of the side member 133 of FIG. 1) and at least one surface (e.g., the first surface 510 of FIG. 5A) of the conductive connection member 410 may be spaced apart from a partial region of the second conductive member 610 (e.g., the second conductive member 610 of FIG. 5A and FIG. 5B) wherein coupling-feeding power is possible.

According to an embodiment, the elastic portion 550 of the conductive connection member 410 may be in direct contact with the first conductive member 420. According to an embodiment, at least one of the first surface 510, the second surface 520, the third surface 530, or the fourth surface 540 of the conductive connection member 410 may be spaced apart, by a gap, from a partial region of the second conductive member 610. For example, the first surface 510 of the conductive connection member 410 may be spaced apart, by a gap, from the partial region of the second conductive member 610 wherein coupling-feeding power is possible. For another example, the first surface 510 and the second surface 520 of the conductive connection member 410 may be spaced apart, by a gap, from the second conductive member 610 wherein coupling-feeding power is possible at the same time. For further example, the third surface 430 and the fourth surface 440 of the conductive connection member 410 may be spaced apart, by a gap, from the second conductive member 610 wherein coupling-feeding power is possible.

In an embodiment, the wireless communication circuit may directly feed power to the first conductive member 420 via the conductive connection member 410 (refer to ① of FIG. 8), and may coupling-feed power to the second conductive member 610 via the conductive connection member 410 (refer to ② of FIG. 8). For example, an electronic device may transmit and/or receive a signal of a first frequency band through a first radiation path (①), and may transmit and/or receive a signal of a second frequency band through a second radiation path (②). For example, the first frequency band and the second frequency band may be different. The second frequency band may be higher than the first frequency band. The second frequency band may include, for example, a Sub6 band.

Figure 9:
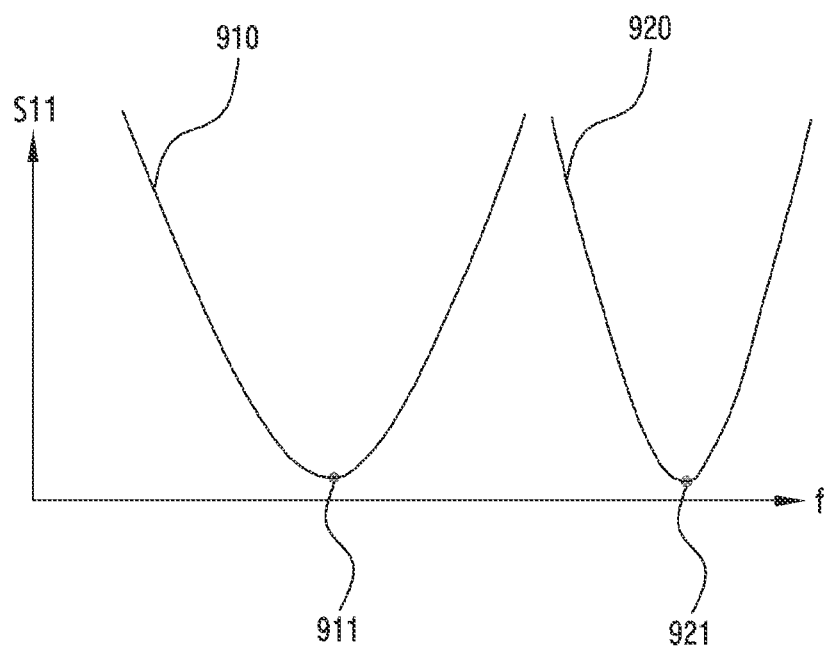
FIG. 9 is a graph illustrating an Si 1 parameter according to various embodiments.

FIG. 9 is a graph illustrating an Si 1 parameter according to various embodiments.

Referring to FIG. 9, in an embodiment, the wireless communication circuit may transmit a signal of a first frequency band 910 by feeding power to the first conductive member 420, and the wireless communication circuit may transmit a signal of a second frequency band 920 higher than the first frequency band 910 by feeding power to the second conductive member 610. For example, a resonant frequency 911 of the first frequency band 910 may be lower than a resonant frequency 921 of the second frequency band 920.

According to an embodiment, the first frequency band 910 may correspond to at least one of a frequency band of about 600 MHz or more and about 3,600 MHz or less or a frequency band of about 3,300 MHz or more and about 4,200 MHz or less.

According to an embodiment, the second frequency band 920 may correspond to at least one of a frequency band of about 3,300 MHz or more and about 4,200 MHz or less or a frequency band of about 4,400 MHz or more and about 5,000 MHz or less. According to an embodiment, when the second frequency band 920 corresponds to the frequency band of about 3,300 MHz or more and about 4,200 MHz or less, the first frequency band 910 may correspond to a frequency band of about 2,400 MHz or more and about 2,700 MHz or less lower than the second frequency band 920. In an example, when the second frequency band 920 corresponds to the frequency band of about 3,300 MHz or more and about 4,200 MHz or less, the first frequency band 910 may correspond to a frequency band of about 700 MHz or more and about 2,700 MHz or less.

Figure 10:
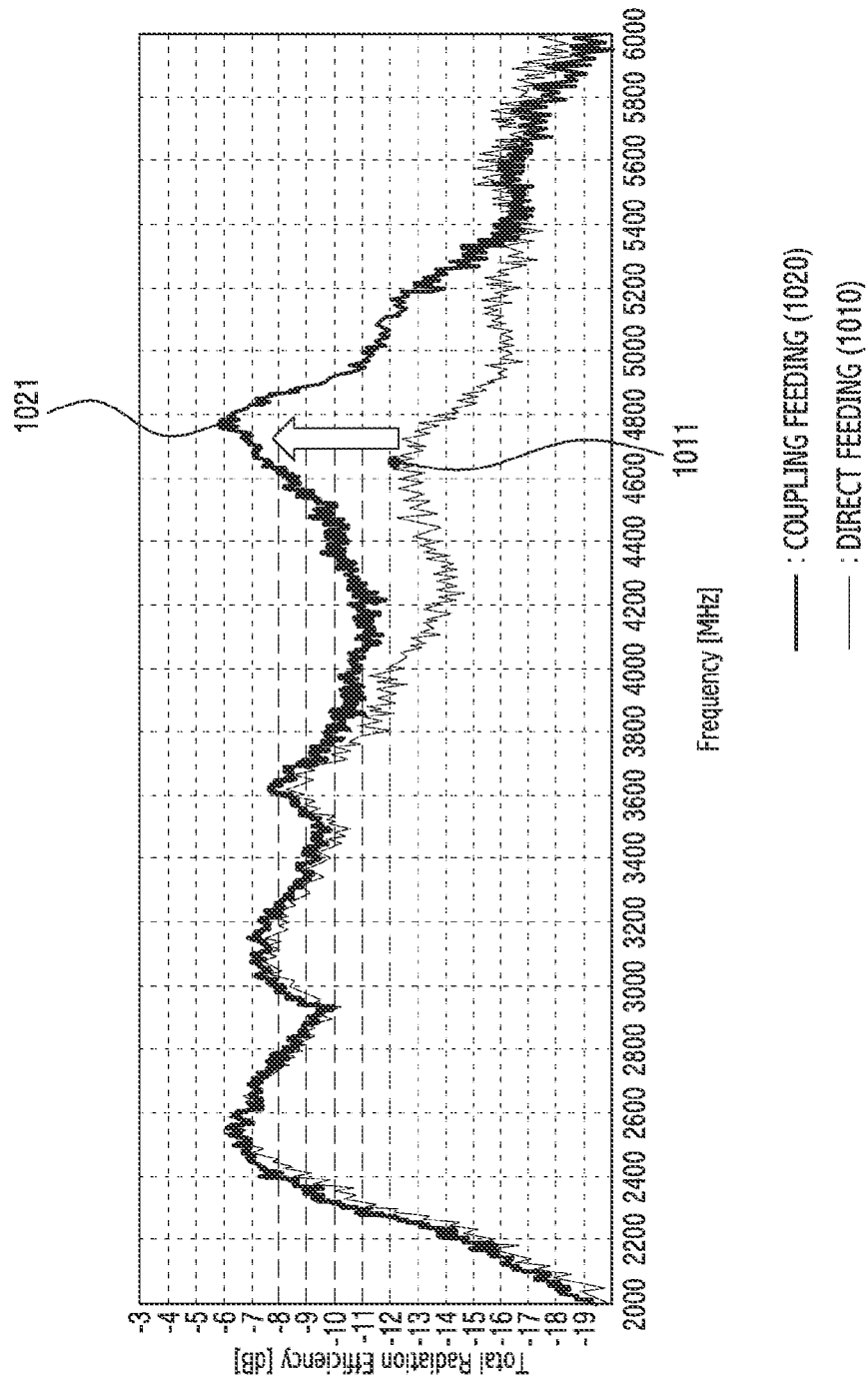
FIG. 10 is a graph illustrating an antenna radiation efficiency according to various embodiments.

FIG. 10 is a graph illustrating antenna radiation efficiency according to various embodiments.

Referring to FIG. 10, a graph 1020 of coupling-feeding power to the second conductive member 610 may have higher antenna radiation efficiency than a graph 1010 of directly feeding power.

In an embodiment, an antenna radiation efficiency may be improved in at least a part of the frequency band of about 3,300 MHz or more and about 4,200 MHz or less or the frequency band of about 4,400 MHz or more and about 5,000 MHz or less. For example, an antenna radiation efficiency at a frequency 1021 of maximizing and/or increasing a radiation efficiency of the graph 1020 of coupling-feeding power in the frequency band of about 4,400 MHz or more and about 5,000 MHz or less may be higher than an antenna radiation efficiency at a frequency 1011 of maximizing and/or increasing a radiation efficiency of the graph 1010 of directly feeding power in the frequency band of about 4,400 MHz or more and about 5,000 MHz or less.

According to an embodiment, the antenna radiation efficiency may be improved even in a frequency band other than the frequency band of about 3,300 MHz or more and about 4,200 MHz or less or the frequency band of about 4,400 MHz or more and about 5,000 MHz or less.

Figure 11:
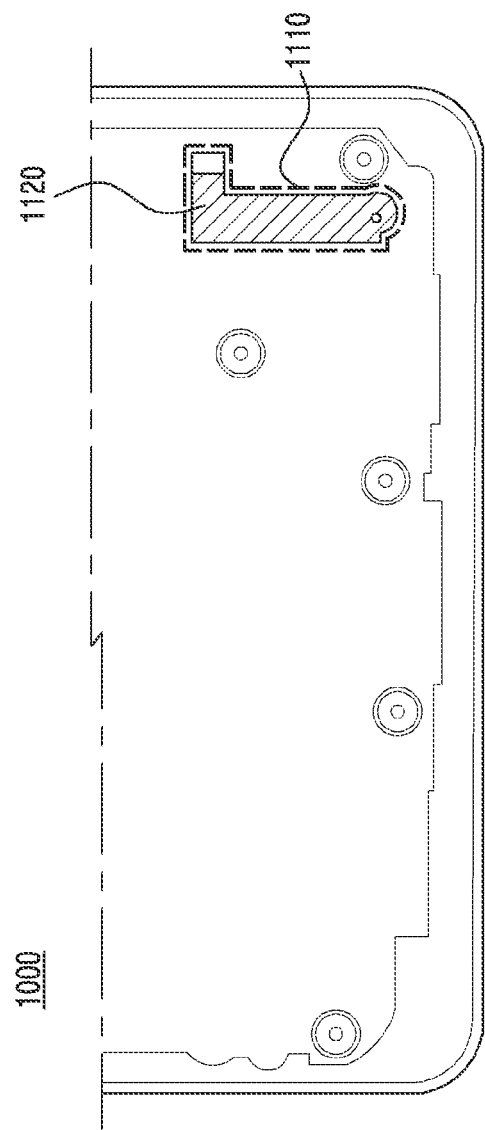
FIG. 11 is a diagram illustrating an example in which a conductive member having a different electrical length is formed on a carrier according to various embodiments.
Figure 12:
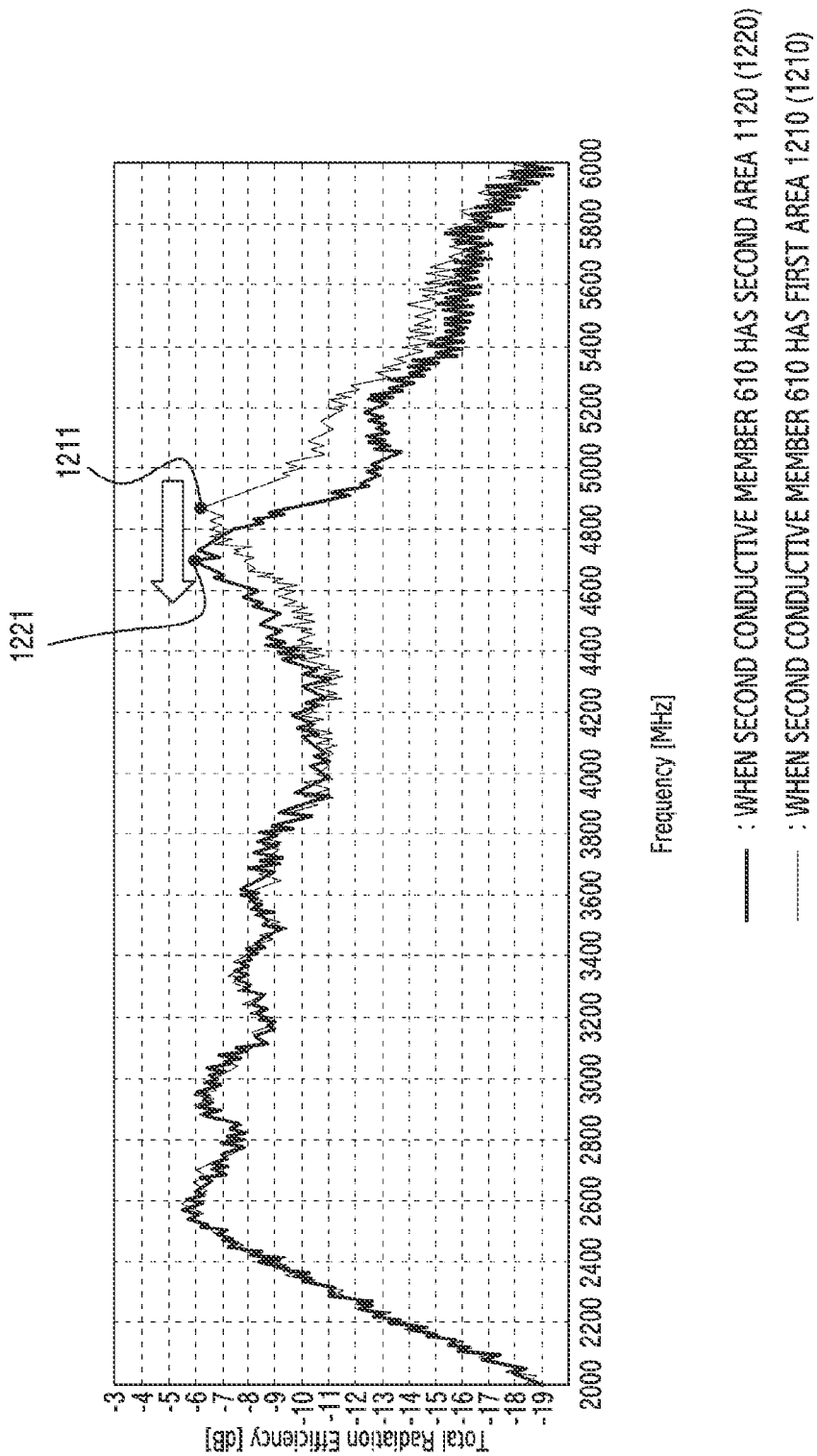
FIG. 12 is a graph illustrating radiation performance dependent on a length of the conductive member of FIG. 11 according to various embodiments.

FIG. 11 is a diagram 1000 illustrating an example in which a conductive member having a different electrical length is formed on a carrier according to various embodiments. FIG. 12 is a graph illustrating radiation performance dependent on the different electrical length of the conductive member of FIG. 11 according to various embodiments.

Referring to FIG. 11, an electrical length may be determined according to an area in which the second conductive member 610 is formed. For example, when the area in which the second conductive member 610 is formed increases, the electrical length may increase.

According to an embodiment, the second conductive member 610 may be formed to have a first area 1110 on at least one surface of the carrier 140 (e.g., the first surface 310 of the carrier 140). According to an embodiment, the second conductive member 610 may be formed in an LDS pattern on the carrier 140. For another example, the second conductive member 610 may be formed of an FPCB.

According to an embodiment, the second conductive member 610 may be formed to have a second area 1120 on at least one surface of the carrier 140. In this case, the second area 1120 may be larger than the first area 1110. For example, the second area 1120 may have a longer electrical length than the first area 1110.

Referring to FIG. 12, as the electrical length of the second conductive member 610 increases, a graph representing an antenna radiation efficiency in at least some frequency bands may move to the left in parallel.

According to an embodiment, a graph 1220 when an area of the second conductive member 610 is the second area 1120 may move to the left compared to a graph 1210 when the area of the second conductive member 610 is the first area 1110. According to an embodiment, a frequency 1221 of maximizing and/or increasing an antenna radiation efficiency of the graph 1220 when the area of the second conductive member 610 is the second area 1120 in a frequency band of about 4,400 MHz or more and about 5,000 MHz or less may be located to the left compared to a frequency 1211 of maximizing and/or increasing an antenna radiation efficiency of the graph 1210 when the area of the second conductive member 610 is the first area 1110 in the frequency band of about 4,400 MHz or more and about 5,000 MHz or less.

Figure 13A:
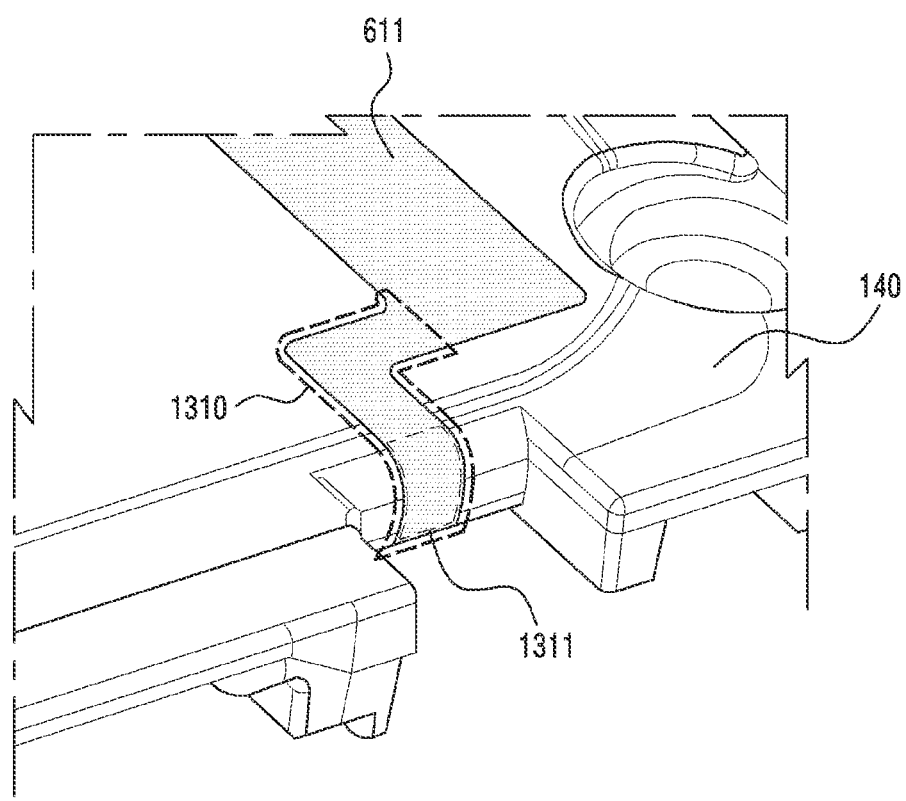
FIG. 13A is a perspective view illustrating a carrier according to various embodiments.
Figure 13B:
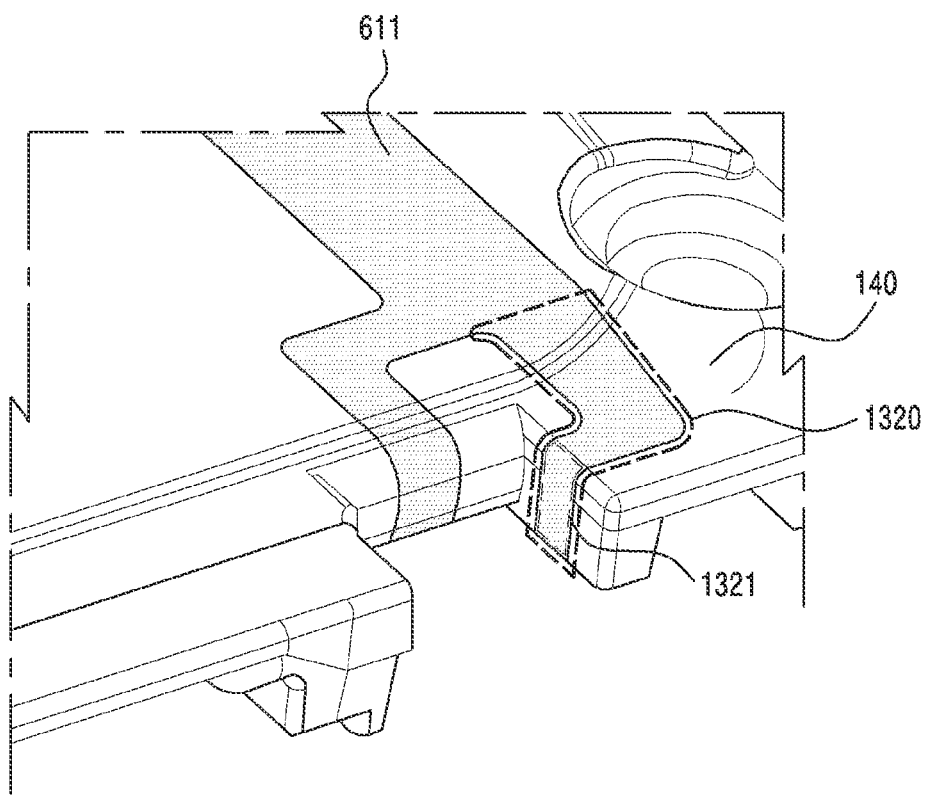
FIG. 13B is a perspective view illustrating a carrier according to various embodiments.

FIG. 13A is a perspective view illustrating the second conductive member 610 extending to be coupled to one surface of the conductive connection member 410 according to various embodiments. FIG. 13B is a perspective view illustrating the second conductive member 610 extending to be coupled to a plurality of surfaces of the conductive connection member 410 according to various embodiments.

Referring to FIG. 13A and FIG. 13B, the first portion 611 of the second conductive member 610 may be formed on at least a part of the carrier 140, and the at least part of the carrier 140 may have a dug shape.

According to an embodiment, the first portion 611 of the second conductive member 610 may further include a first extension portion 1310. In an embodiment, the first extension portion 1310 included in the second conductive member 610 may include a second extension portion 1311 formed on a first side surface of the carrier 140. According to an embodiment, the second extension portion 1311 may be formed to be substantially perpendicular to the first portion 611 of the second conductive member 610. In an embodiment, the second conductive member 610 may not include the second portion 612. According to an embodiment, the second extension portion 1311 may be spaced apart, by a gap, from any one surface of the conductive connection member 410.

According to an embodiment, the first portion 611 of the second conductive member 610 may further include a third extension portion 1320. In an embodiment, the third extension portion 1320 included in the second conductive member 610 may include a fourth extension portion 1321 formed on a second side surface of the carrier 140. According to an embodiment, the fourth extension portion 1321 may be formed to be substantially perpendicular to the first portion 611 of the second conductive member 610. According to an embodiment, the fourth extension portion 1321 may be spaced apart, by a gap, from any one surface of the conductive connection member 410.

According to an embodiment, the first portion 611 of the second conductive member 610 may include the first extension portion 1310 and the third extension portion 1320 at the same time. In an embodiment, the second conductive member 610 may include the second extension portion 1311 formed on the first side surface, and the fourth extension portion 1321 formed on the second side surface. According to an embodiment, the second extension portion 1311 and the fourth extension portion 1321 may be spaced apart, by a gap, from one surface (e.g., the second surface 520 or third surface 530 of FIG. 5A or 5B) of the conductive connection member 410. For example, the second extension portion 1311 may be spaced apart from the third surface 530 of the conductive connection member 410 wherein coupling-feeding power is possible, and the fourth extension portion 1321 may be spaced apart from the second surface 520 wherein coupling-feeding power is possible.

Figure 14:
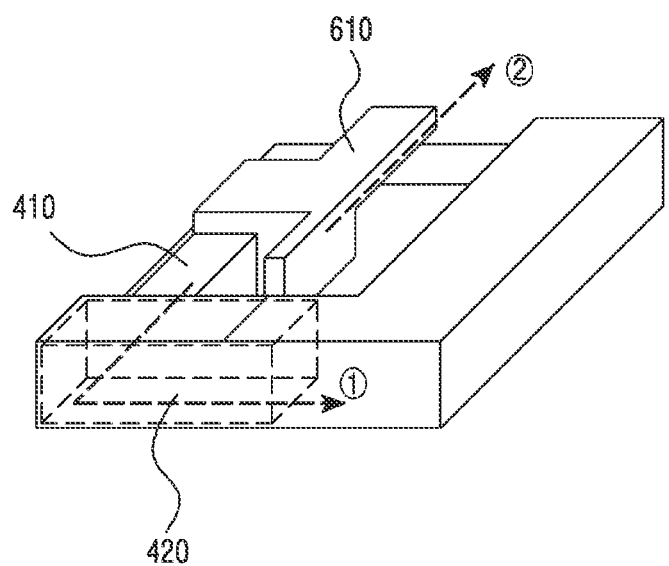
FIG. 14 is a perspective view illustrating a first conductive member, a second conductive member, a conductive connection member, and antenna radiation of the carrier of FIG. 13B according to various embodiments.
Figure 15:
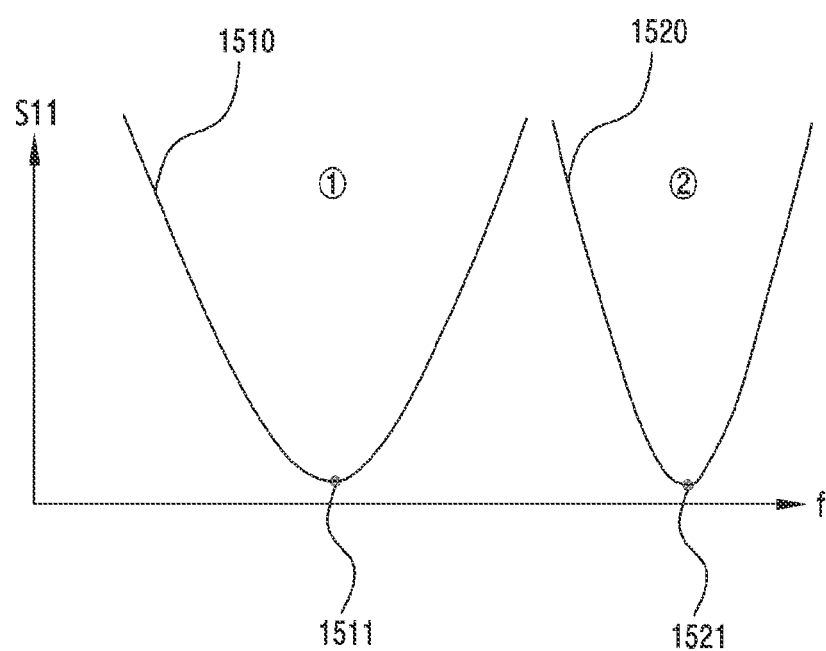
FIG. 15 is a graph illustrating an S11 parameter of the carrier of FIG. 13B according to various embodiments.

FIG. 14 is a perspective view illustrating the first conductive member 420, the second conductive member 610, the conductive connection member 410, and antenna radiation paths (①) and (②)) of FIG. 13B according to various embodiments. FIG. 15 is a graph illustrating an Si 1 parameter of FIG. 13B according to various embodiments.

Referring to FIG. 14, the wireless communication circuit may directly feed power to the first conductive member 420 via the conductive connection member 410 (e.g., referring to ① of FIG. 14), and may coupling-feed power to the second conductive member 610 via the conductive connection member 410 (e.g., refer to ② of FIG. 14). For example, an electronic device may transmit and/or receive a signal of a first frequency band through a first radiation path (①), and may transmit and/or receive a signal of a second frequency band through a second radiation path (②). For example, the first frequency band and the second frequency band may be different. The second frequency band may be higher than the first frequency band. The second frequency band may include, for example, a Sub6 band. Referring to FIG. 14, the second conductive member 610 may be coupled to a plurality of surfaces of the conductive connection member 410. For example, the second conductive member 610 may be coupling-fed through the second surface 520 or the third surface 530 of the conductive connection member 410.

Referring to FIG. 15, in an embodiment, the wireless communication circuit may transmit a signal of a first frequency band 1510 by feeding power to the first conductive member 420, and the wireless communication circuit may transmit a signal of a second frequency band 1520 higher than the first frequency band 1510 by feeding power to the second conductive member 610. For example, a resonant frequency 1511 of the first frequency band 1510 may be lower than a resonant frequency 1521 of the second frequency band 1520. An S11 value at the resonant frequency 1521 of the second frequency band 1520 of the embodiment of FIG. 15 may be smaller than an S11 value at the resonant frequency 921 of the second frequency band 920 of the embodiment of FIG. 9.

According to an embodiment, the first frequency band 1510 may correspond to at least one of a frequency band of about 600 MHz or more and about 3,600 MHz or less or a frequency band of about 3,300 MHz or more and about 4,200 MHz or less.

According to an embodiment, the second frequency band 1520 may correspond to at least one of a frequency band of about 3,300 MHz or more and about 4,200 MHz or less or a frequency band of about 4,400 MHz or more and about 5,000 MHz or less. According to an embodiment, when the second frequency band 1520 corresponds to the frequency band of about 3,300 MHz or more and about 4,200 MHz or less, the first frequency band 1510 may correspond to a frequency band of about 2,400 MHz or more and about 2,700 MHz or less lower than the second frequency band 1520. In an example, when the second frequency band 1520 corresponds to the frequency band of about 3,300 MHz or more and about 4,200 MHz or less, the first frequency band 1510 may correspond to a frequency band of about 700 MHz or more and about 2,700 MHz or less.

Figure 16:
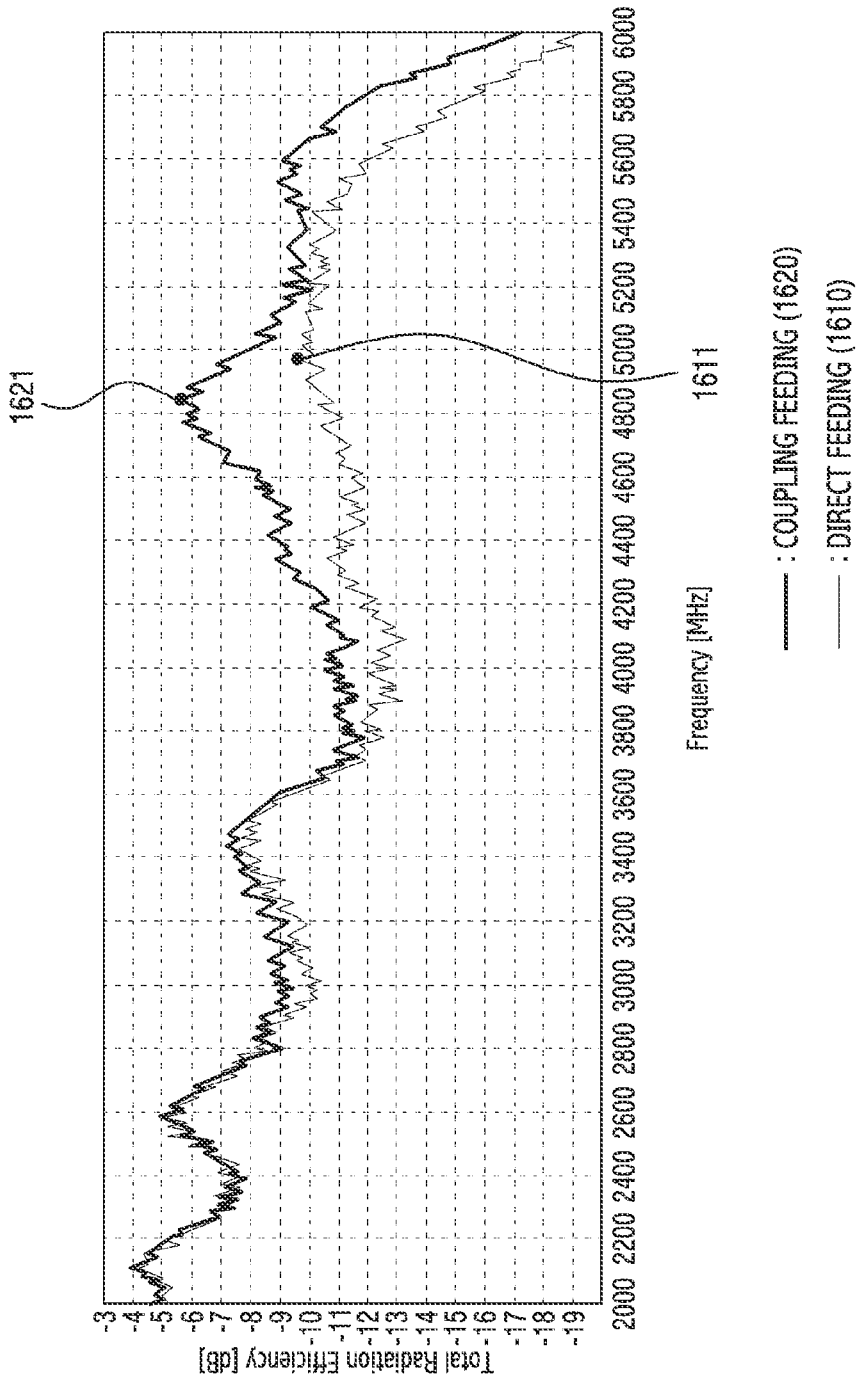
FIG. 16 is a graph illustrating an antenna radiation efficiency of the carrier of FIG. 13B according to various embodiments.

FIG. 16 is a graph illustrating an antenna radiation efficiency of the arrangement of FIG. 13B according to various embodiments.

Referring to FIG. 16, a graph 1620 of coupling feeding may improve an antenna radiation efficiency compared to a graph 1610 of direct feeding. For example, in the embodiment of FIG. 13B, a coupling area with the conductive connection member 410 increases compared to the embodiment of FIG. 13A, and thus a frequency characteristic may be improved to a broadband.

In an embodiment, an antenna radiation efficiency may be improved in at least a part of a frequency band of about 3,300 MHz or more and about 4,200 MHz or less or a frequency band of about 4,400 MHz or more and about 5,000 MHz or less. At this time, an antenna radiation efficiency of a frequency 1621 of maximizing and/or increasing a radiation efficiency of the graph 1620 of coupling feeding in the frequency band of about 4,400 MHz or more and about 5,000 MHz or less may be higher than an antenna radiation efficiency of a frequency 1611 of maximizing and/or increasing a radiation efficiency of the graph 1610 of direct feeding in the frequency band of about 4,400 MHz or more and about 5,000 MHz or less.

According to an embodiment, the antenna radiation efficiency may be improved even in a frequency band other than the frequency band of about 3,300 MHz or more and about 4,200 MHz or less or the frequency band of about 4,400 MHz or more and about 5,000 MHz or less.

Hereinafter, a device to which various embodiments disclosed in the present disclosure may be applied or extended will be described with reference to FIG. 17.

Figure 17:
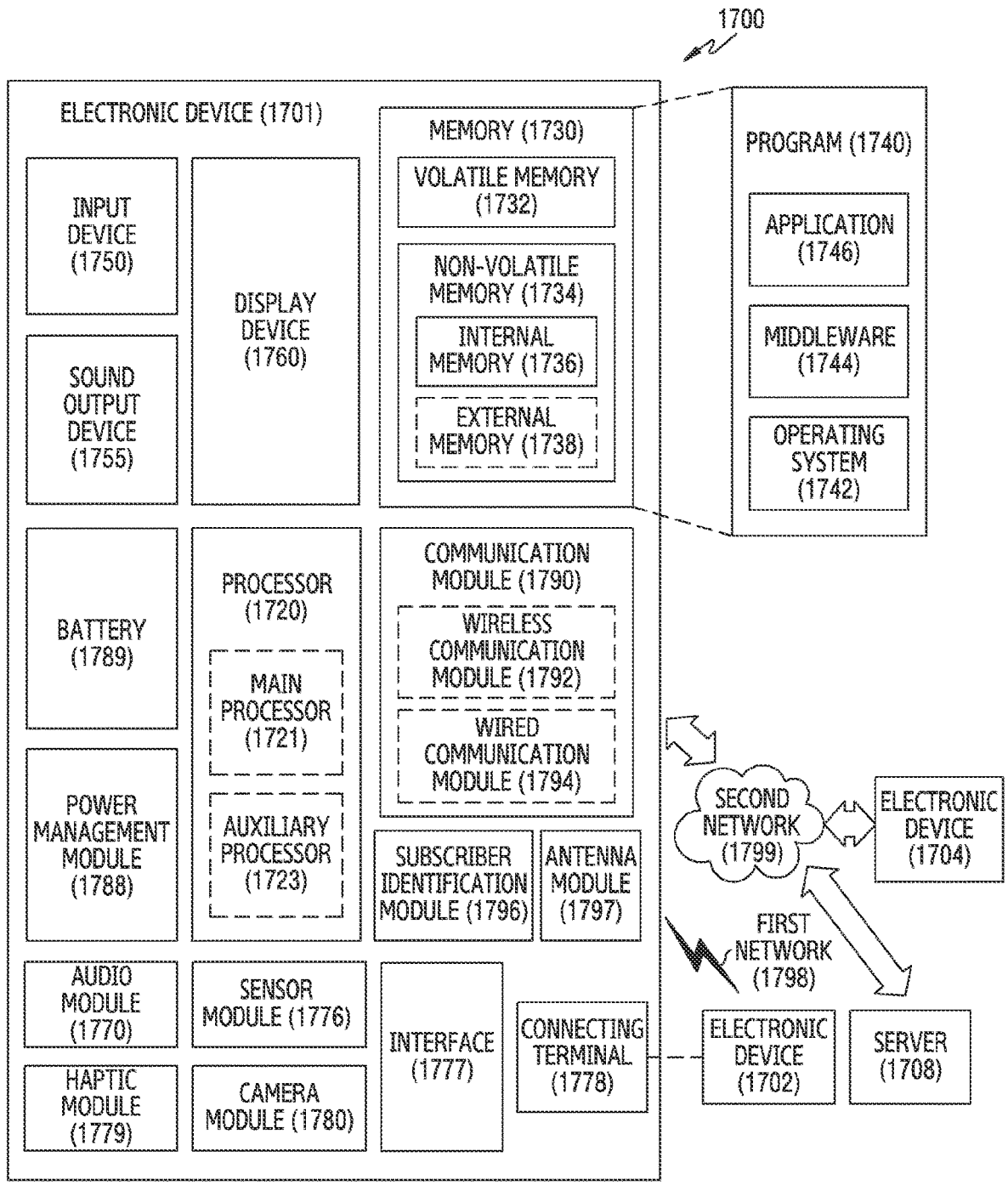
FIG. 17 is a block diagram illustrating an example electronic device in a network environment according to various embodiments.

FIG. 17 is a block diagram illustrating an example electronic device 1701 in a network environment 1700 according to various embodiments. Referring to FIG. 17, the electronic device 1701 in the network environment 1700 may communicate with an electronic device 1702 via a first network 1798 (e.g., a short-range wireless communication network), or an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module (SIM) 1796, or an antenna module 1797. In various embodiments, at least one (e.g., the display device 1760 or the camera module 1780) of the components may be omitted from the electronic device 1701, or one or more other components may be added in the electronic device 1701. In various embodiments, some of the components may be implemented as single integrated circuitry. For example, the sensor module 1776 (e.g., a fingerprint sensor, an iris sensor, or an illuminance sensor) may be implemented as embedded in the display device 1760 (e.g., a display).

The processor 1720 may execute, for example, software (e.g., a program 1740) to control at least one other component (e.g., a hardware or software component) of the electronic device 1701 coupled with the processor 1720, and may perform various data processing or computation. According to an embodiment, as at least part of the data processing or computation, the processor 1720 may load a command or data received from another component (e.g., the sensor module 1776 or the communication module 1790) in volatile memory 1732, process the command or the data stored in the volatile memory 1732, and store resulting data in non-volatile memory 1734. According to an embodiment, the processor 1720 may include a main processor 1721 (e.g., a central processing unit (CPU) or an application processor (AP)), and an auxiliary processor 1723 (e.g., a graphics processing unit (GPU), an image signal processor (ISP), a sensor hub processor, or a communication processor (CP)) that is operable independently from, or in conjunction with, the main processor 1721. Additionally or alternatively, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display device 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input device 1750 may receive a command or data to be used by other component (e.g., the processor 1720) of the electronic device 1701, from the outside (e.g., a user) of the electronic device 1701. The input device 1750 may include, for example, a microphone, a mouse, a keyboard, or a digital pen (e.g., a stylus pen).

The sound output device 1755 may output sound signals to the outside of the electronic device 1701. The sound output device 1755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1760 may visually provide information to the outside (e.g., a user) of the electronic device 1701. The display device 1760 may include, for example, a display, a hologram device, or a projector and control circuitry to control a corresponding one of the display, hologram device, and projector. According to an embodiment, the display device 1760 may include touch circuitry adapted to detect a touch, or sensor circuitry (e.g., a pressure sensor) adapted to measure the intensity of force incurred by the touch.

The audio module 1770 may convert a sound into an electrical signal and vice versa. According to an embodiment, the audio module 1770 may obtain the sound via the input device 1750, or output the sound via the sound output device 1755 or a headphone of an external electronic device (e.g., an electronic device 1702) directly (e.g., wiredly) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wiredly) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to an embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or infrared data association (IrDA)) or the second network 1799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity (IMSI)) stored in the subscriber identification module 1796.

The antenna module 1797 may transmit or receive a signal or power to or from the outside (e.g., the external electronic device) of the electronic device 1701. According to an embodiment, the antenna module 1797 may include an antenna including a radiating element including a conductive material or a conductive pattern formed in or on a substrate (e.g., PCB). According to an embodiment, the antenna module 1797 may include a plurality of antennas. In such a case, at least one antenna appropriate for a communication scheme used in the communication network, such as the first network 1798 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment, another component (e.g., a radio frequency integrated circuit (RFIC)) other than the radiating element may be additionally formed as part of the antenna module 1797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 and 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, or client-server computing technology may be used, for example.

An electronic device (e.g., 100 of FIG. 1A and FIG. 1B) of an example embodiment may include: a housing (e.g., 110 of FIG. 1A and FIG. 1B), a first conductive member comprising a conductive material (e.g., 420 of FIG. 4A and FIG. 4B) corresponding to a portion of the housing, a second conductive member comprising a conductive material (e.g., 610 of FIG. 6A and FIG. 6B) arranged inside the housing, a printed circuit board (e.g., 130 of FIG. 2) arranged inside the housing, a wireless communication circuit arranged on the printed circuit board, and a conductive connection member comprising a conductive material (e.g., 410 of FIG. 4B) electrically connected to the wireless communication circuit. The conductive connection member may include an elastic portion (e.g., 550 of FIG. 5A and FIG. 5B) and at least one surface (e.g., 510, 520, 530, or 540 of FIG. 5A and FIG. 5B). The elastic portion of the conductive connection member may be in contact with the first conductive member. The at least one surface of the conductive connection member may be spaced apart, by a gap, from a portion of the second conductive member. The wireless communication circuit may be configured to: receive a signal (e.g., 910 of FIG. 9) of a first frequency band by directly feeding power to the first conductive member via the conductive connection member, and receive a signal (e.g., 920 of FIG. 9) of a second frequency band higher than the first frequency band by coupling-feeding power to the second conductive member via the conductive connection member.

According to an example embodiment, the elastic portion of the conductive connection member may be formed on a surface different from the at least one surface.

According to an example embodiment, the second conductive member may be formed on an inner or outer surface of a carrier (e.g., 310 of FIG. 3A and FIG. 3B) located between a rear plate (e.g., 112 of FIG. 1B) of the housing and the printed circuit board.

According to an example embodiment, the second conductive member may be formed in a laser direct structuring (LDS) pattern.

According to an example embodiment, the second conductive member may be implemented as a flexible printed circuit board (FPCB).

According to an example embodiment, the housing may include a side portion (e.g., 113 of FIG. 1A and FIG. 1B), and the first conductive member may be a part of the side portion.

According to an example embodiment, the first conductive member may be located in a first portion (e.g., 1131 of FIG. 1A and FIG. 1B) of the housing.

According to an example embodiment, a conductive portion of the side portion may be segmented by an insulating portion.

According to an example embodiment, the second frequency band may correspond to at least one of a frequency band of 3,300 MHz or more and 4,200 MHz or less or a frequency band of 4,400 MHz or more and 5,000 MHz or less.

According to an example embodiment, the second conductive member may have a specified electrical length (e.g., 1120 of FIG. 11) to increase radiation performance in the frequency band of 4,400 MHz or more and 5,000 MHz or less.

According to an example embodiment, the at least one surface of the conductive connection member may include a first surface (e.g., 510 of FIG. 5A and FIG. 5B), a second surface (e.g., 520 of FIG. 5A and FIG. 5B), a third surface (e.g., 530 of FIG. 5A and FIG. 5B), or a fourth surface (e.g., 540 of FIG. 5A and FIG. 5B), and the second surface, the third surface, or the fourth surface may be perpendicular to the first surface.

According to an example embodiment, the at least one surface of the conductive connection member may include at least one of the first surface, the second surface, the third surface, or the fourth surface.

According to an example embodiment, the housing may include a first plate (e.g., 120 of FIG. 1A and FIG. 1B) and a second plate (e.g., 112 of FIG. 1A and FIG. 1B) facing in a direction opposite to the first plate, and the second plate may include a non-conductive member.

According to an example embodiment, an electronic device (e.g., 100 of FIG. 1A and FIG. 1B) may include: a first conductive member comprising a conductive material (e.g., 420 of FIG. 4A or FIG. 4B), a second conductive member comprising a conductive material (e.g., 610 of FIG. 6A or FIG. 6B), a printed circuit board (e.g., 130 of FIG. 2), a wireless communication circuit arranged on the printed circuit board, and a conductive connection member comprising a conductive material (e.g., 410 of FIG. 4B) electrically connected to the wireless communication circuit. The conductive connection member may include an elastic portion (e.g., 550 of FIG. 5A and FIG. 5B) and at least one surface (e.g., 510, 520, 530, or 540 of FIG. 5A and FIG. 5B). The elastic portion of the conductive connection member may be in contact with the first conductive member. The at least one of the first surface, the second surface, the third surface, or the fourth surface of the conductive connection member may be spaced apart, by a gap, from a portion of the second conductive member. The wireless communication circuit may be configured: receive a signal (e.g., 910 of FIG. 9) of a first frequency band by directly feeding power to the first conductive member via the conductive connection member, and receive a signal (e.g., 920 of FIG. 9) of a second frequency band higher than the first frequency band by coupling-feeding power to the second conductive member via the conductive connection member.

According to an example embodiment, the second conductive member may be formed in a laser direct structuring (LDS) pattern.

According to an example embodiment, the second conductive member may be implemented as a flexible printed circuit board (FPCB).

According to an example embodiment, the second frequency band may correspond to at least one of a frequency band of 3,300 MHz or more and 4,200 MHz or less or a frequency band of 4,400 MHz or more and 5,000 MHz or less.

According to an example embodiment, the second conductive member may have a specified electrical length (e.g., 1120 of FIG. 11) to increase radiation performance in the frequency band of 4,400 MHz or more and 5,000 MHz or less.

According to an example embodiment, the at least one surface of the conductive connection member may include a first surface (e.g., 510 of FIG. 5A and FIG. 5B), a second surface (e.g., 520 of FIG. 5A and FIG. 5B), a third surface (e.g., 530 of FIG. 5A and FIG. 5B), or a fourth surface (e.g., 540 of FIG. 5A and FIG. 5B), and the second surface, the third surface, or the fourth surface may be perpendicular to the first surface.

According to an example embodiment, the at least one surface of the conductive connection member may include at least one of the first surface, the second surface, the third surface, or the fourth surface.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will also be understood by those skilled in the art the various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a first conductive member comprising a conductive material disposed in a portion of the housing;
a second conductive member comprising a conductive material arranged inside the housing;
a printed circuit board arranged inside the housing;
a wireless communication circuit arranged on the printed circuit board; and
a conductive connection member comprising a conductive material electrically connected to the wireless communication circuit,
wherein the conductive connection member comprises an elastic portion and at least one surface,
the elastic portion of the conductive connection member is in contact with the first conductive member,
the at least one surface of the conductive connection member is spaced apart, by a gap, from a portion of the second conductive member, and
the wireless communication circuit is configured to: transmit and/or receive a signal of a first frequency band by directly feeding power to the first conductive member via the conductive connection member, and transmit and/or receive a signal of a second frequency band higher than the first frequency band by coupling-feeding power to the second conductive member via the conductive connection member.

2. The electronic device of claim 1, wherein the elastic portion of the conductive connection member is formed on a surface different from the at least one surface.

3. The electronic device of claim 1, wherein the second conductive member is formed on an inner or outer surface of a carrier located between a rear plate of the housing and the printed circuit board.

4. The electronic device of claim 3, wherein the second conductive member is formed on the carrier in a laser direct structuring (LDS) pattern.

5. The electronic device of claim 3, wherein the second conductive member comprises a flexible printed circuit board (FPCB) on the carrier.

6. The electronic device of claim 1, wherein the housing comprises a side portion, and the first conductive member is a part of the side portion.

7. The electronic device of claim 6, wherein a conductive portion of the side portion is segmented by an insulating portion.

8. The electronic device of claim 1, wherein the first conductive member is located in a first portion of the housing.

9. The electronic device of claim 1, wherein the second frequency band corresponds to at least one of a frequency band of 3,300 MHz or more and 4,200 MHz or less or a frequency band of 4,400 MHz or more and 5,000 MHz or less.

10. The electronic device of claim 9, wherein the second conductive member has a specified electrical length to increase radiation performance in the frequency band of 4,400 MHz or more and 5,000 MHz or less.

11. The electronic device of claim 1, wherein the at least one surface of the conductive connection member comprises a first surface, a second surface, a third surface, or a fourth surface, and the second surface, the third surface, or the fourth surface is perpendicular to the first surface.

12. The electronic device of claim 11, wherein the at least one surface of the conductive connection member comprises at least one of the first surface, the second surface, the third surface, or the fourth surface.

13. The electronic device of claim 1, wherein the housing comprises a first plate and a second plate facing in a direction opposite to the first plate, and
the second plate comprises a non-conductive member comprising a non-conductive material.

* * * * *